US012319054B2

(12) United States Patent
Higashi et al.

(10) Patent No.: US 12,319,054 B2
(45) Date of Patent: Jun. 3, 2025

(54) PRINTING CASSETTE INCLUDING CASE HOUSING THEREIN PRINTING TAPE, AND LABEL AFFIXED TO CASE AND HAVING RFID TAG

(71) Applicant: BROTHER KOGYO KABUSHIKI KAISHA, Nagoya (JP)

(72) Inventors: Kosuke Higashi, Nagoya (JP); Shinji Ukai, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 169 days.

(21) Appl. No.: 18/188,252

(22) Filed: Mar. 22, 2023

(65) Prior Publication Data

US 2023/0219353 A1 Jul. 13, 2023

Related U.S. Application Data

(63) Continuation of application No. PCT/JP2021/034290, filed on Sep. 17, 2021.

(30) Foreign Application Priority Data

Sep. 30, 2020 (JP) ................................ 2020-164212

(51) Int. Cl.

*B41J 15/04* (2006.01)
*B41J 3/407* (2006.01)
*B41J 29/38* (2006.01)

(52) U.S. Cl.

CPC ............ *B41J 15/044* (2013.01); *B41J 29/38* (2013.01)

(58) Field of Classification Search

CPC ............................ B41J 15/044; B41J 3/4075
See application file for complete search history.

(56) References Cited

U.S. PATENT DOCUMENTS

| | | | |
|---|---|---|---|
| 3,672,603 | A | 6/1972 | Swain |
| 3,804,227 | A | 4/1974 | Cappotto et al. |
| 3,823,808 | A | 7/1974 | Murata et al. |
| 3,948,382 | A | 4/1976 | Nesbitt et al. |
| 4,034,935 | A | 7/1977 | Plaza et al. |
| 4,252,450 | A | 2/1981 | Goodman et al. |
| 4,351,619 | A | 9/1982 | Duke et al. |

(Continued)

FOREIGN PATENT DOCUMENTS

| | | | |
|---|---|---|---|
| CN | 101042821 | A | 9/2007 |
| CN | 102092201 | A | 6/2011 |

(Continued)

OTHER PUBLICATIONS

Endo, Machine TranslationofJP-2015193113-A (Year: 2015).*

(Continued)

*Primary Examiner* — Scott A Richmond
(74) *Attorney, Agent, or Firm* — KENEALY VAIDYA LLP

(57) ABSTRACT

A printing cassette includes a case, a tape, and a label. The case includes a first case part and a second case part. The first case part and the second case part are coupled to each other. The tape is for printing. At least a portion of the tape is housed in the case. The label is provided with a radio-frequency identification (RFID) tag having an antenna. The label is affixed across both the first case part and the second case part.

14 Claims, 17 Drawing Sheets

(56) References Cited

U.S. PATENT DOCUMENTS

| | | | |
|---|---|---|---|
| 4,397,574 | A | 8/1983 | Wojdyla |
| 4,402,619 | A | 9/1983 | Paque et al. |
| 4,490,059 | A | 12/1984 | Daughters |
| 4,499,513 | A | 2/1985 | Umeda |
| 4,538,931 | A | 9/1985 | Nagashima |
| 4,565,128 | A | 1/1986 | Moriyama et al. |
| 4,598,780 | A | 7/1986 | Iwasaki et al. |
| 4,668,961 | A | 5/1987 | Hiramatsu |
| 4,832,514 | A | 5/1989 | Basile |
| 4,856,921 | A | 8/1989 | Hatakeyama |
| 5,099,378 | A | 3/1992 | Turgeon |
| 5,145,268 | A | 9/1992 | Cavallini |
| 5,325,114 | A | 6/1994 | Fogle et al. |
| 5,402,954 | A | 4/1995 | Skavnak et al. |
| 5,435,657 | A | 7/1995 | Pearce et al. |
| 5,472,286 | A | 12/1995 | Uemura et al. |
| 5,619,244 | A | 4/1997 | Manna |
| 5,645,360 | A | 7/1997 | Iwane et al. |
| 5,917,532 | A | 6/1999 | Cornell et al. |
| 5,959,652 | A | 9/1999 | Privin |
| 6,494,628 | B1 | 12/2002 | Konoshita et al. |
| 6,511,238 | B1 | 1/2003 | Glize |
| 2007/0172286 | A1 | 7/2007 | Pomfret |
| 2008/0084494 | A1 | 4/2008 | Pomfret |
| 2008/0310904 | A1 | 12/2008 | Yamaguchi et al. |
| 2009/0148221 | A1 | 6/2009 | Terry et al. |
| 2018/0086100 | A1* | 3/2018 | Uematsu ................ B41J 29/387 |
| 2018/0117935 | A1 | 5/2018 | Oida et al. |
| 2018/0311970 | A1 | 11/2018 | Suzuki |
| 2019/0030936 | A1 | 1/2019 | Nishihara et al. |
| 2020/0290369 | A1 | 9/2020 | Mizutani et al. |
| 2020/0293845 | A1* | 9/2020 | Murayama ....... G06K 19/07718 |

FOREIGN PATENT DOCUMENTS

| | | | |
|---|---|---|---|
| CN | 103273748 | A | 9/2013 |
| CN | 111688371 | A | 9/2020 |
| EP | 0414544 | A2 | 2/1991 |
| EP | 1040932 | A1 | 10/2000 |
| GB | 2016411 | A | 9/1979 |
| JP | S50-36734 | B1 | 11/1975 |
| JP | S54-111914 | A | 9/1979 |
| JP | S59-6460 | A | 1/1984 |
| JP | S59-95180 | A | 6/1984 |
| JP | S60-8072 | U | 1/1985 |
| JP | S60-9657 | U | 1/1985 |
| JP | S60-36255 | U | 3/1985 |
| JP | S60-46254 | U | 4/1985 |
| JP | S60-48456 | U | 4/1985 |
| JP | S60-188821 | A | 9/1985 |
| JP | S60-224571 | A | 11/1985 |
| JP | S61-154877 | A | 7/1986 |
| JP | S62-103179 | A | 5/1987 |
| JP | S63-156762 | U | 10/1988 |
| JP | H02-6173 | A | 1/1990 |
| JP | H02-9562 | U | 1/1990 |
| JP | H02-11379 | A | 1/1990 |
| JP | H02-11380 | A | 1/1990 |
| JP | H02-37568 | Y | 10/1990 |
| JP | H03-97181 | A | 4/1991 |
| JP | H03-284973 | A | 12/1991 |
| JP | H04-152176 | A | 5/1992 |
| JP | H05-41834 | U | 6/1993 |
| JP | H05-53956 | U | 7/1993 |
| JP | H07-9745 | A | 1/1995 |
| JP | H07-32710 | A | 2/1995 |
| JP | H07-276755 | A | 10/1995 |
| JP | H07-276757 | A | 10/1995 |
| JP | H08-183204 | A | 7/1996 |
| JP | H08-183232 | A | 7/1996 |
| JP | 2000-103149 | A | 4/2000 |
| JP | 2000280586 | A | 10/2000 |
| JP | 2001-047713 | A | 2/2001 |
| JP | 2002-211092 | A | 7/2002 |
| JP | 2002-308518 | A | 10/2002 |
| JP | 2007-502221 | A | 2/2007 |
| JP | 2008-261968 | A | 10/2008 |
| JP | 2009-196804 | A | 9/2009 |
| JP | 2011-148167 | A | 8/2011 |
| JP | 2011-150007 | A | 8/2011 |
| JP | 2012-200970 | A | 10/2012 |
| JP | 2014-170142 | A | 9/2014 |
| JP | 2015193113 | A * | 11/2015 |
| JP | 2017109469 | A | 6/2017 |
| JP | 2018183944 | A | 11/2018 |
| JP | 2019-25889 | A | 2/2019 |
| JP | 2020-73319 | A | 5/2020 |
| WO | 00/32406 | A1 | 6/2000 |
| WO | 2005/018944 | A1 | 3/2005 |
| WO | 2006/033432 | A1 | 3/2006 |

OTHER PUBLICATIONS

Japanese Office Action for the corresponding Japanese patent application No. 2020-164212 dated Aug. 6, 2024.
Chinese Office Action for the corresponding Chinese patent application No. 202180064702.4 dated Aug. 14, 2024.
International Preliminary Report On Patentability and English language Written Opinion of the International Search Report for PCT/JP2021/034290 dated Mar. 28, 2023.
International Search Report for PCT/JP2021/034290 dated Nov. 2, 2021.

* cited by examiner

PRINTING CASSETTE INCLUDING CASE HOUSING THEREIN PRINTING TAPE, AND LABEL AFFIXED TO CASE AND HAVING RFID TAG

REFERENCE TO RELATED APPLICATIONS

This is a bypass continuation application of International Application No. PCT/JP2021/034290 filed Sep. 17, 2021 claiming priority from Japanese Patent Application No. 2020-164212 filed on Sep. 30, 2020. The entire contents of the International Application and the priority application are incorporated herein by reference.

BACKGROUND ART

In a conventional printing device that prints on printing tape, cassettes accommodating printing tape are attached to and detached from the body of the printing device to supply and interchange printing tape. The case of the cassette that accommodates the printing tape is generally configured by assembling a plurality of parts together.

The case is also provided with an RFID tag for identifying the cassette.

DESCRIPTION

With the conventional cassette described above, any looseness between coupled parts in the case could adversely affect how printing tape is drawn out of the cassette, and the printing device could suffer a drop in printing quality as a result.

In view of the foregoing, it is an object of the present disclosure to provide a printing cassette capable of suppressing any looseness in the case parts.

In order to attain the above and other object, according to one aspect, the present disclosure provides a printing cassette including a case, a tape, and a label. The case includes a first case part and a second case part. The first case part and the second case part are coupled to each other. The tape is for printing. At least a portion of the tape is housed in the case. The label is provided with a radio-frequency identification (RFID) tag having an antenna. The label is affixed across both the first case part and the second case part.

According to another aspect, the present disclosure provides a printing device includes the printing cassette according to the above aspect and a printing device body to which the printing cassette is attachable.

With these configurations, looseness between the first case part and second case part can be suppressed by the label provided with the RFID tag. Further, the label used to affix the RFID tag to the case also serves to suppress looseness between the case parts, thereby reducing the number of required parts in the printing cassette.

According to still another aspect, the present disclosure provides a printing cassette including a case, a tape, an output gear, and a label. The tape is for printing. At least a portion of the tape is housed in the case. The output gear is for outputting a drive force for conveying the tape. At least a portion of the output gear is housed in the case. The label is affixed to the case. The label is provided with a radio-frequency identification (RFID) tag having an antenna. The label is overlapped with the output gear as viewed in a direction orthogonal to a rotational axis of the output gear.

This configuration can reduce the size of the case surface on which the label having the RFID tag is affixed. As a result, the size of the printing cassette can be reduced.

1. FIRST EMBODIMENT

1-1. Configuration of a Printing Device

Figure 1A:
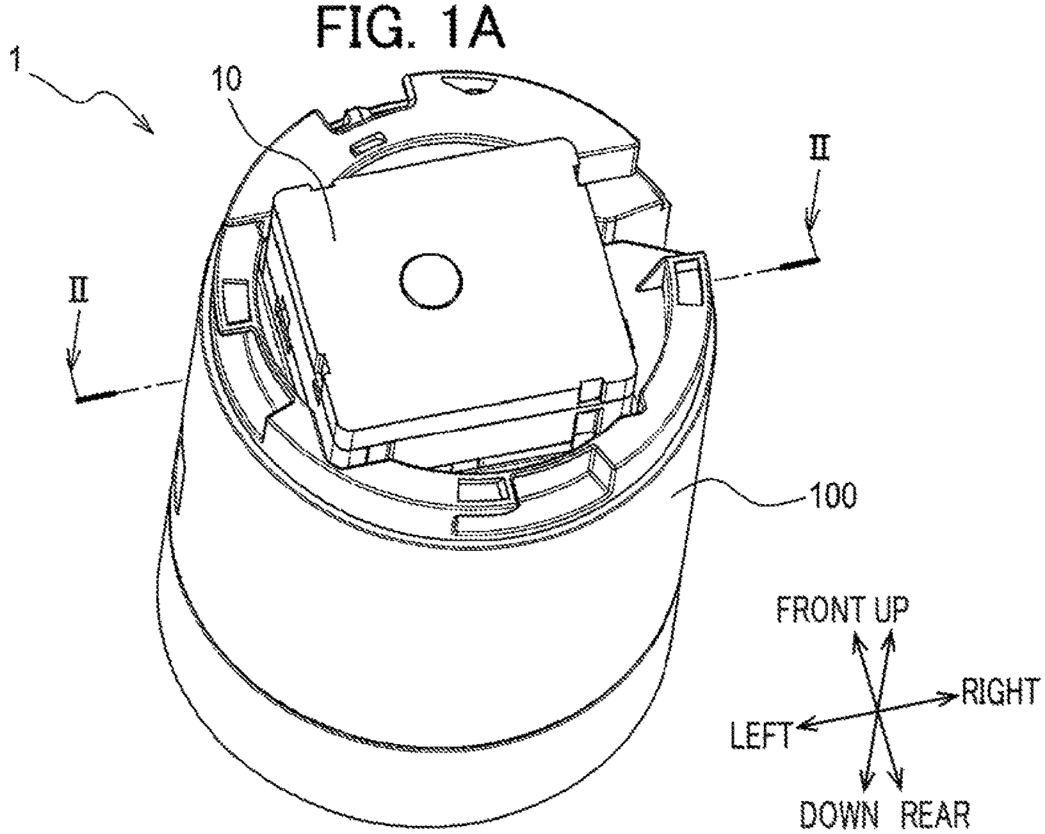
FIG. 1A is a schematic perspective view of a printing device.

A printing device 1 shown in FIG. 1A is provided with a printing cassette 10, and a printing device body 100. The printing device 1 is a device configured to print on a tape-like printing medium.

In the present embodiment, an axial direction of an output gear 21 will be called the up-down direction, a direction perpendicular to the up-down direction in which the output gear 21 and an input spool 16 are aligned will be called the front-rear direction, and a direction perpendicular to both the up-down direction and the front-rear direction will be called the left-right direction.

<Printing Device Body>

Figure 1B:
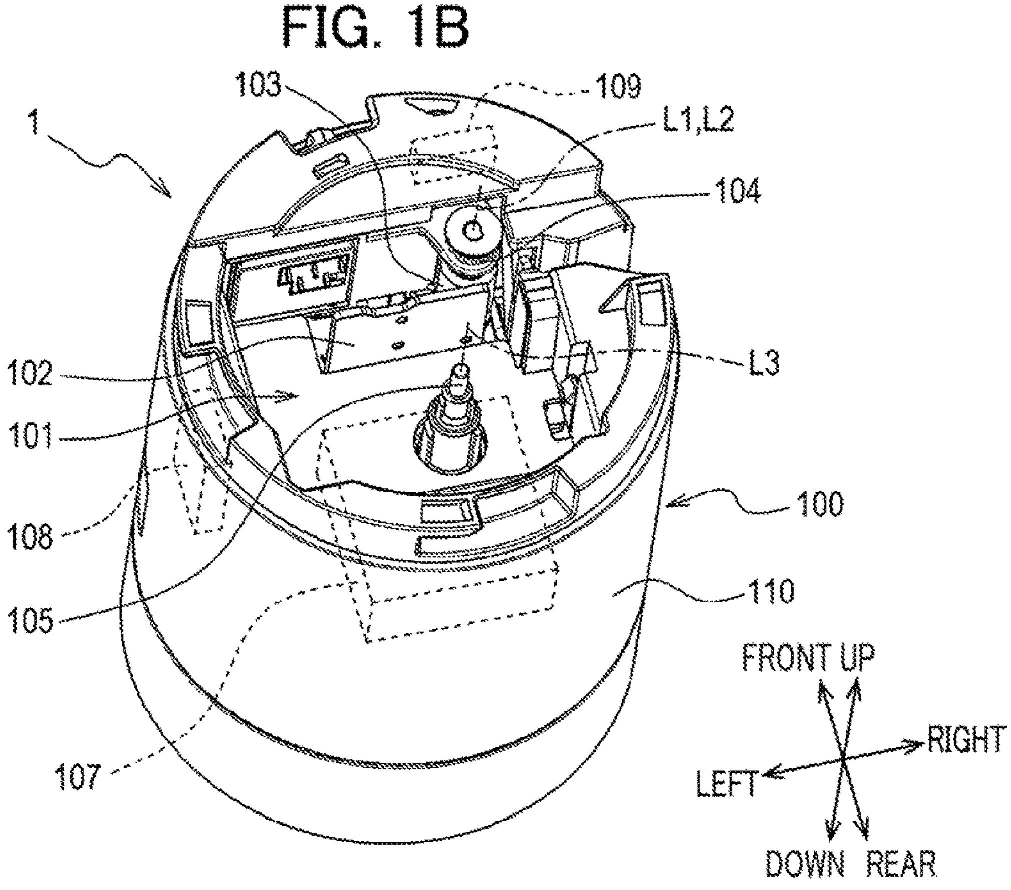
FIG. 1B is a schematic perspective view of a printing device body of the printing device shown in FIG. 1A.

As shown in FIG. 1B, the printing device body 100 is provided with a cassette accommodation part 101, a print head 102, a platen roller 103, a platen gear 104, a drive shaft 105, a drive source 107, a detection unit 108, a control unit 109, and a housing 110.

<Cassette Accommodation Part>

The cassette accommodation part 101 is a recessed portion to which the printing cassette 10 is attached. The cassette accommodation part 101 is provided in the housing 110. The cassette accommodation part 101 functions to position the printing cassette 10.

<Print Head>

The print head 102 is disposed inside the cassette accommodation part 101. The print head 102 has a plurality of heating elements whose heating is individually controlled.

<Platen Roller>

The platen roller 103 is disposed inside the cassette accommodation part 101 near the print head 102 so as to face the print head 102. The platen roller 103 can pivot in a direction toward the print head 102 and in a direction away from the print head 102. The platen roller 103 has a rotational axis L1 that is parallel to the up-down direction.

<Platen Gear>

The platen gear 104 is coupled to the platen roller 103 and has a rotational axis L2. In the present embodiment, the rotational axis L2 of the platen gear 104 is collinear with the rotational axis L1 of the platen roller 103 (i.e., the rotational axis L1 and the rotational axis L2 are disposed on a straight line). The platen gear 104 can pivot together with the platen roller 103.

<Drive Shaft>

The drive shaft 105 is configured to be inserted into the input spool 16 and an input gear 22 in the printing cassette 10. The drive shaft 105 is configured to rotate the input spool 16 and input gear 22.

The drive shaft 105 is disposed inside the cassette accommodation part 101. The drive shaft 105 has a rotational axis L3 that is parallel to the up-down direction. The drive shaft 105 is configured to rotate about the rotational axis L3 by the drive source 107.

<Drive Source>

The drive source 107 is configured to drive the drive shaft 105 to rotate. A mechanism including a motor and gears, for example, can be used as the drive source 107.

<Detection Unit>

The detection unit 108 is configured to detect identification information assigned to the printing cassette 10 from the printing cassette 10.

Figure 2:
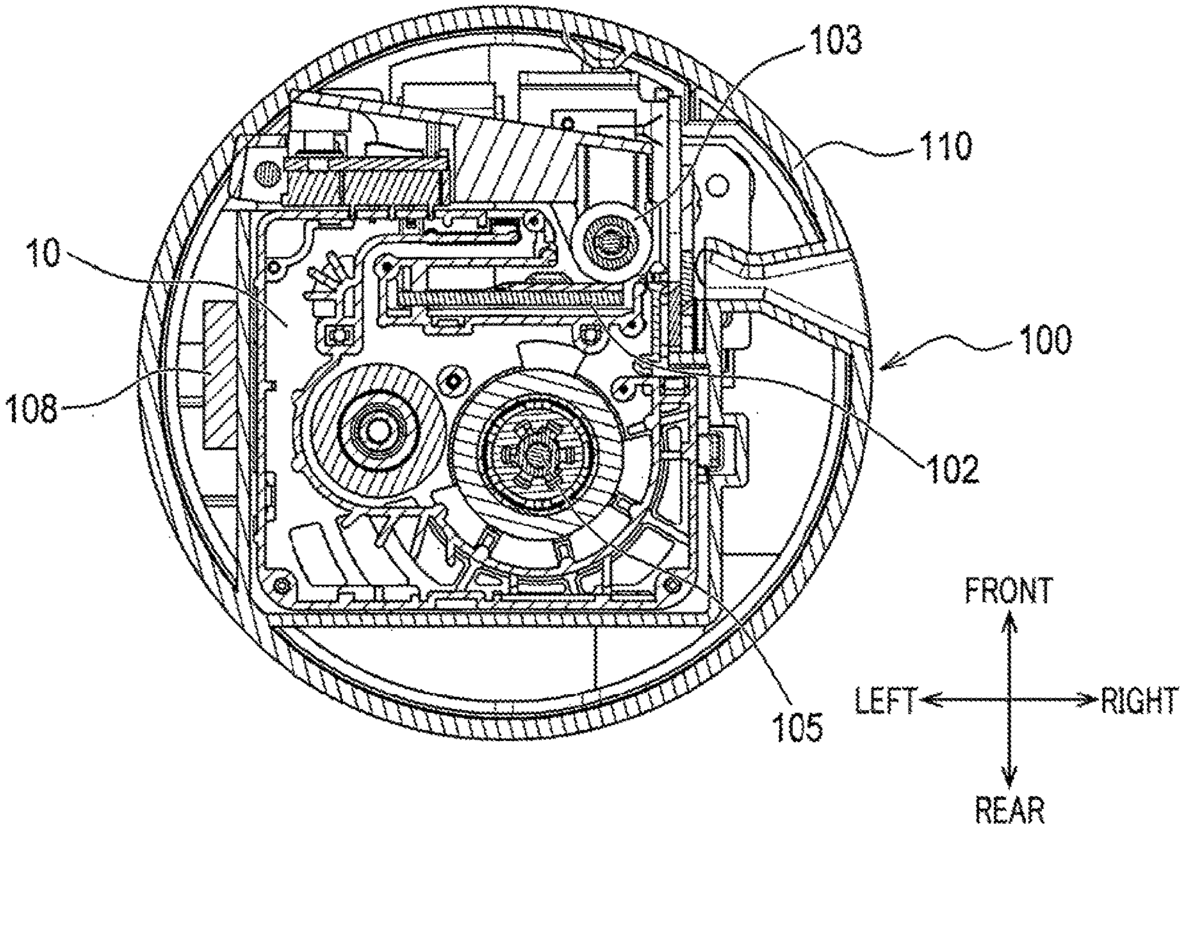
FIG. 2 is a schematic cross-sectional view taken along line II-II of FIG. 1A.

Specifically, the detection unit 108 is a reader that communicates wirelessly with an RFID (radio-frequency identification) tag of the printing cassette 10 to read identification information from the RFID tag. As shown in FIG. 2, the detection unit 108 is disposed in proximity to the printing cassette 10 attached to the printing device body 100.

<Control Unit>

The control unit 109 is configured to control printing on a printing tape 11A on the basis of the identification information detected by the detection unit 108.

The control unit 109 is configured of a computer that includes a processor; storage media such as RAM, ROM, and the like; an input device and an output device, for example. The control unit 109 controls the print head 102 and the drive source 107 by executing a pre-stored program.

<Printing Cassette>

The printing cassette 10 accommodates a printing medium (i.e., the printing tape 11A). The printing cassette 10 is attachable to and detachable from the printing device body 100. The printing cassette 10 can be interchanged to replenish the printing medium and to change the type of printing media (e.g., the size, color, material, etc.).

Figures 3A, 3B, 3C:
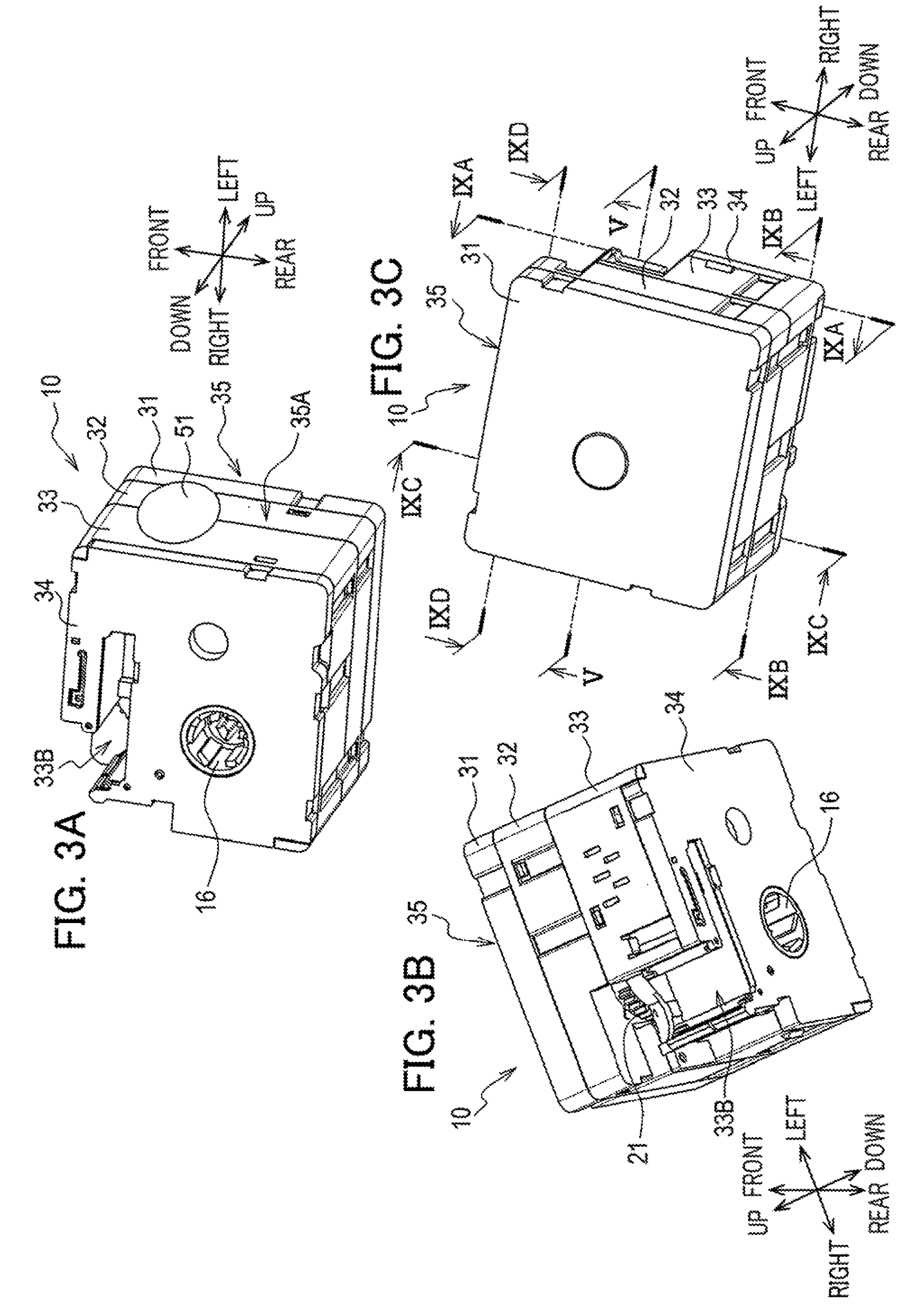
FIGS. 3A to 3C are schematic perspective views each illustrating a printing cassette shown in FIG. 1A.

As shown in FIGS. 3A, 3B, and 3C, the printing cassette 10 is provided with a case 35 and a label 51. The case 35 houses at least a portion of the printing tape 11A provided for printing and at least a portion of an ink ribbon 14A. The label 51 is affixed to the case 35.

The outer shape of the printing cassette 10 (i.e., the shape of the case 35) is a rectangular parallelepiped with sides parallel to the up-down direction, sides parallel to the front-rear direction, and sides parallel to the left-right direction. The case 35 is inserted downward into the cassette accommodation part 101. The case 35 includes a first cover part 31 (an example of the third case part), a first frame part 32 (an example of the first case part), a second frame part 33 (an example of the second case part), and a second cover part 34.

Figure 4:
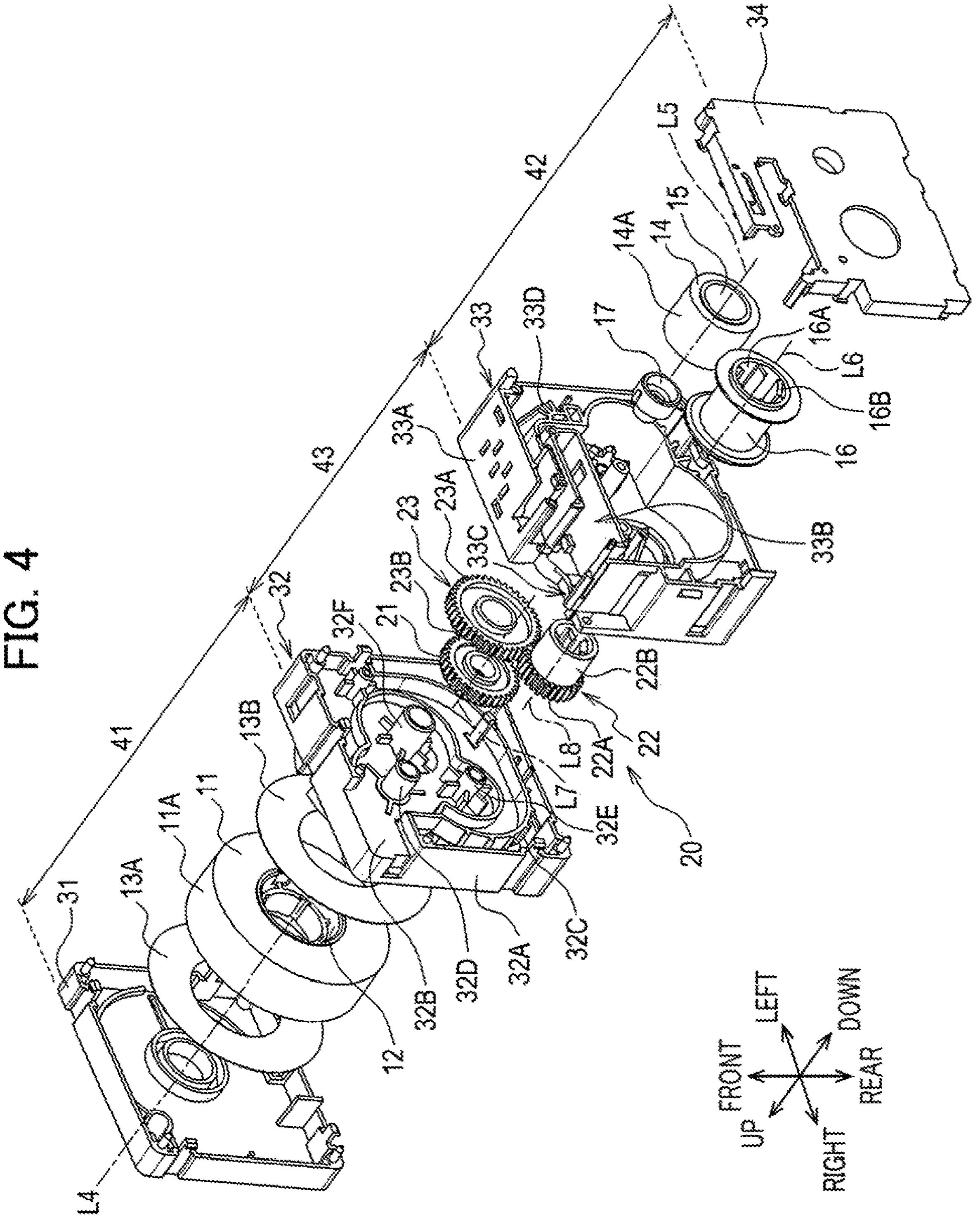
FIG. 4 is a schematic exploded perspective view of the printing cassette shown in FIG. 3A.

As shown in FIG. 4, the printing cassette 10 is provided with a first roll 11, a first supply spool 12, spacer films 13A and 13B, a second roll 14, a second supply spool 15, an input spool 16, a clutch spring holder 17, and a transmission mechanism 20.

<First Roll>

The first roll 11 is configured of the printing tape 11A wound around the first supply spool 12. Printing is performed on the printing tape 11A. Printing is performed on the surface of the printing tape 11A by the print head 102 in the printing device body 100 and the ink ribbon 14A.

The two spacer films 13A and 13B are disposed on respective outer sides of the first roll 11 in the up-down direction so as to sandwich the first roll 11. The spacer films 13A and 13B are respectively disposed between the first roll 11 and first cover part 31 and between the first roll 11 and first frame part 32.

<First Supply Spool>

The first supply spool 12 is rotatable about a rotational axis L4. The first supply spool 12 supplies the printing tape 11A to the print head 102 by rotating as the platen roller 103 of the printing device body 100 conveys the printing tape 11A. The rotational axis L4 of the first supply spool 12 is parallel to the up-down direction.

<Second Roll>

The second roll 14 is configured of the ink ribbon 14A wound around the second supply spool 15. The ink ribbon 14A is used for printing on the printing tape 11A.

The ink ribbon 14A is overlaid on the printing tape 11A in a head opening 33B and is used for printing by the print head 102. The ink ribbon 14A that has been used to perform printing is taken up on the input spool 16.

Rotational resistance is applied to the second roll 14 by a clutch spring held in the clutch spring holder 17. At least a portion of the second roll 14 is disposed in a position overlapping the first roll 11 in the up-down direction.

<Second Supply Spool>

The second supply spool 15 is rotatable about a rotational axis L5. The rotational axis L5 of the second supply spool 15 is parallel to the rotational axis L4 of the first supply spool 12. In other words, the rotational axis L5 is parallel to the up-down direction. The second supply spool 15 supplies the ink ribbon 14A to the print head 102 by rotating as the input spool 16 takes up the used ink ribbon 14A.

<Input Spool>

The input spool 16 is rotatable about a rotational axis L6. The rotational axis L6 of the input spool 16 is parallel to the rotational axis L5 of the second supply spool 15.

The input spool 16 is cylindrical and has a hollow area defined by an inner circumferential surface 16A. Splines 16B are provided on the inner circumferential surface 16A of the input spool 16. The drive shaft 105 of the printing device body 100 is coupled to the splines 16B. The input spool 16 is rotated by the drive shaft 105 to take up the ink ribbon 14A.

<Transmission Mechanism>

In a state where the printing cassette 10 is attached to the printing device body 100, the transmission mechanism 20 transmits the drive force of the drive source 107 received from the drive shaft 105 to the platen roller 103 and rotates the platen roller 103 at a rotational speed individually set for that printing cassette 10. The transmission mechanism 20 has the output gear 21, an input gear 22, and an idle gear 23.

Figure 5:
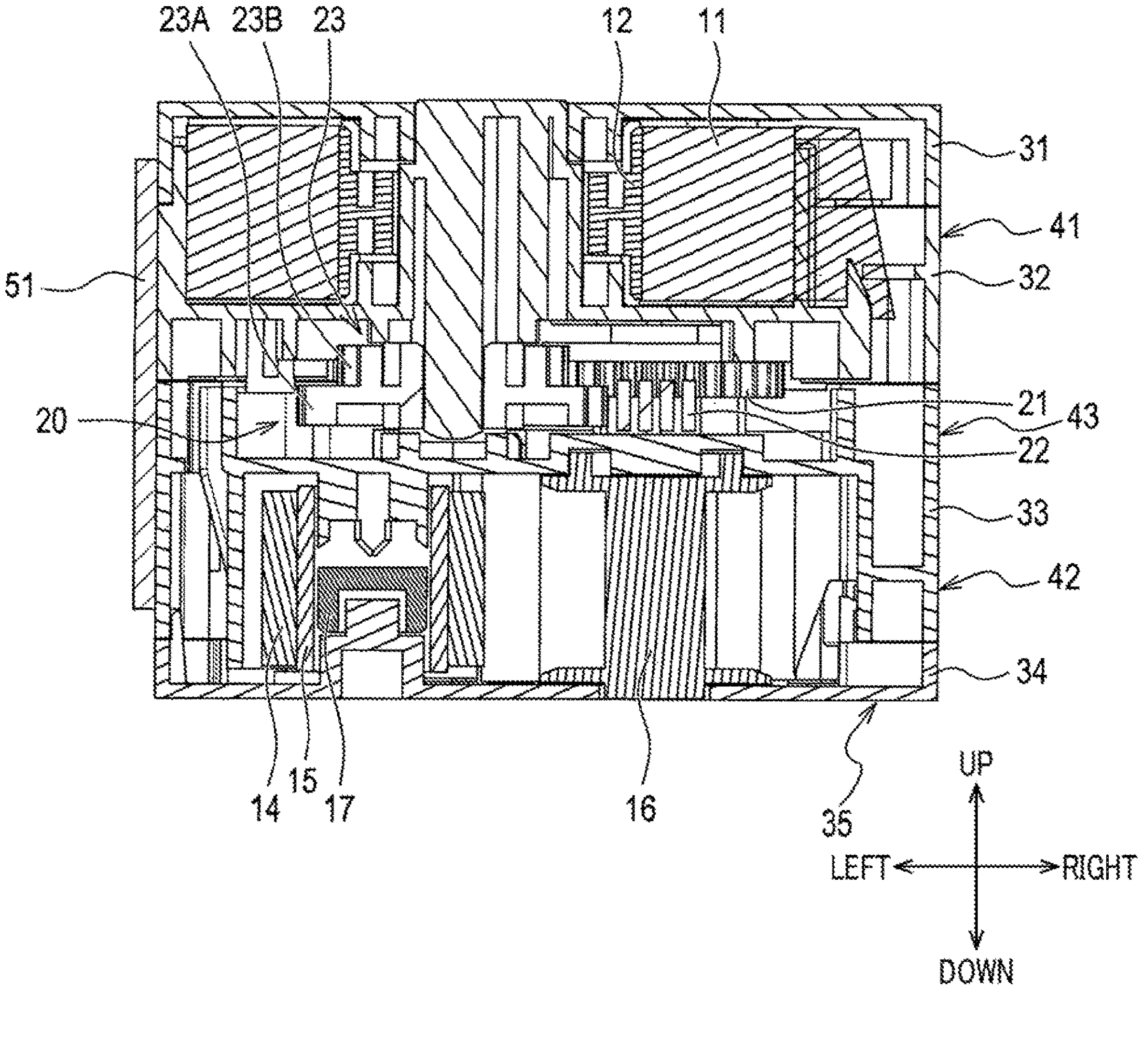
FIG. 5 is a schematic cross-sectional view taken along line V-V of FIG. 3C.

As shown in FIG. 5, the first roll 11, transmission mechanism 20, and second roll 14 are arranged in the up-down direction in the order of the first roll 11, transmission mechanism 20, and second roll 14. In other words, the transmission mechanism 20 is positioned between the first roll 11 and second roll 14 in the up-down direction.

<Output Gear>

The output gear 21 shown in FIG. 4 is an external gear provided for externally outputting a drive force used for conveying the printing tape 11A. Specifically, the output gear 21 outputs the drive force to the platen gear 104 of the printing device body 100.

The output gear 21 is a single gear having a rotational axis L7, and a first side surface and second side surface perpendicular to the rotational axis L7. The rotational axis L7 of the output gear 21 is parallel to the rotational axis L5 of the second supply spool 15. The first side surface of the output gear 21 is positioned closer to the first roll 11 than the second side surface to the first roll 11 in a direction parallel to the rotational axis L5 of the second supply spool 15 (i.e., the up-down direction). The entire first side surface overlaps a cover portion 32B in the up-down direction.

A portion of the output gear 21 is accommodated in the case 35 and another portion of the output gear 21 is exposed in the head opening 33B. The output gear 21 engages with the platen gear 104 in the head opening 33B in a state where the printing cassette 10 is attached to the printing device body 100 (i.e., in a state where the case 35 is accommodated in the cassette accommodation part 101).

<Input Gear>

The input gear 22 is a gear indirectly engaged with the output gear 21 via the idle gear 23 for transmitting a drive force to the output gear 21.

The input gear 22 has an external gear 22A, and a spool 22B. The spool 22B is a cylindrical internal gear having an inner circumferential surface provided with splines. The spool 22B is fixed to one side surface of the external gear 22A. The external gear 22A is rotated together with the spool 22B by the drive force of the drive source 107 inputted into the spool 22B.

The input gear 22 has a rotational axis L8 (i.e., the rotational axes of the external gear 22A and spool 22B). The rotational axis L8 of the input gear 22 is colinear with the rotational axis L6 of the input spool 16. As shown in FIG. 5, the input spool 16, input gear 22, and first roll 11 are arranged in the up-down direction in the order of the input spool 16, input gear 22, and first roll 11.

In other words, the input gear 22 is positioned between the input spool 16 and the first roll 11 in the up-down direction. Further, at least a portion of the input gear 22 is disposed in a position overlapping the first roll 11 in the up-down direction.

The rotational axis L8 of the input gear 22 overlaps the hollow area of the input spool 16 in the up-down direction. Accordingly, the drive shaft 105 is simultaneously inserted into the input spool 16 and the input gear 22. As a result, the input gear 22, although not directly coupled to the input spool 16, is rotated together with the input spool 16 by the drive shaft 105.

<Idle Gear>

The idle gear 23 is drivingly coupled to (i.e., engaged with) the input gear 22 and the output gear 21 for transmitting the drive force inputted into the input gear 22 to the output gear 21. The idle gear 23 is a rotation transmission part that rotates about a rotational axis to transmit the drive force from the input gear 22.

The idle gear 23 is a stepped gear having an upstream gear 23A engaged with the input gear 22, and a downstream gear 23B engaged with the output gear 21. The upstream gear 23A and downstream gear 23B are coaxially juxtaposed. The downstream gear 23B has a smaller diameter than the diameter of the upstream gear 23A. Further, the downstream gear 23B is disposed closer to the first roll 11 than the upstream gear 23A to the first roll 11 in the up-down direction (i.e., above the upstream gear 23A).

The idle gear 23 transmits the drive force inputted into the input gear 22 to the output gear 21 after reducing the rotational speed of the drive force. That is, the transmission mechanism 20 includes a reduction mechanism whose reduction ratio is the transmission ratio obtained by dividing the rotational speed of the input gear 22 by the rotational speed of the output gear 21.

<Case>

As shown in FIG. 4, the first cover part 31 constitutes the upper end portion of the printing cassette 10. The first frame part 32 is disposed below the first cover part 31 and is coupled to the first cover part 31 in the up-down direction. The second frame part 33 is disposed below the first frame part 32 and is coupled to the first frame part 32 in the up-down direction. The second cover part 34 constitutes the lower end portion of the printing cassette 10. The second cover part 34 is coupled to the second frame part 33 in the up-down direction.

The first cover part 31 and first frame part 32 constitute a first housing section 41 that houses the first roll 11. In other words, the first roll 11 is disposed in a space between the first cover part 31 and first frame part 32. That is, the first roll 11 is disposed in a space defined by the first cover part 31 and first frame part 32.

The second cover part 34 and second frame part 33 constitute a second housing section 42 that houses the second roll 14, second supply spool 15, and input spool 16. In other words, the second roll 14, second supply spool 15, and input spool 16 are disposed in a space between the second cover part 34 and second frame part 33. That is, the second roll 14, second supply spool 15, and input spool 16 are disposed in a space defined by the second cover part 34 and second frame part 33.

The first frame part 32 and second frame part 33 constitute a third housing section 43 that houses therein a portion of the output gear 21, the input gear 22, and the idle gear 23. In other words, a portion of the output gear 21, the input gear 22, and the idle gear 23 are disposed in a space between the first frame part 32 and second frame part 33. That is, a portion of the output gear 21, the input gear 22, and the idle gear 23 are disposed in a space defined by the first frame part 32 and second frame part 33. The third housing section 43 is arranged between the first housing section 41 and second housing section 42 in the up-down direction.

The first frame part 32 includes a first side wall 32A, the cover portion 32B, a first guide 32C, a first gear support part 32D, a second gear support part 32E, and a third gear support part 32F. The first side wall 32A constitutes a side surface of the printing cassette 10 that is parallel to the up-down direction.

The cover portion 32B is a portion having a surface perpendicular to the up-down direction. The cover portion 32B is disposed in a position overlapping the output gear 21 in the up-down direction. In the present embodiment, the cover portion 32B is disposed in the right-front corner of the first frame part 32 and formed continuously with the lower end portion of the first side wall 32A. The surface of the cover portion 32B (an example of the first restricting surface) faces the output gear 21 and restricts movement of the output gear 21 in a direction parallel to the rotational axis L7 of the output gear 21 (i.e., the up-down direction).

The output gear 21, cover portion 32B, and first roll 11 are arranged in the up-down direction in the order of the output gear 21, cover portion 32B, and first roll 11. As described above, the entire area of the first side surface of the output gear 21 (i.e., the upper surface) overlaps the cover portion 32B in the up-down direction.

Figure 6:
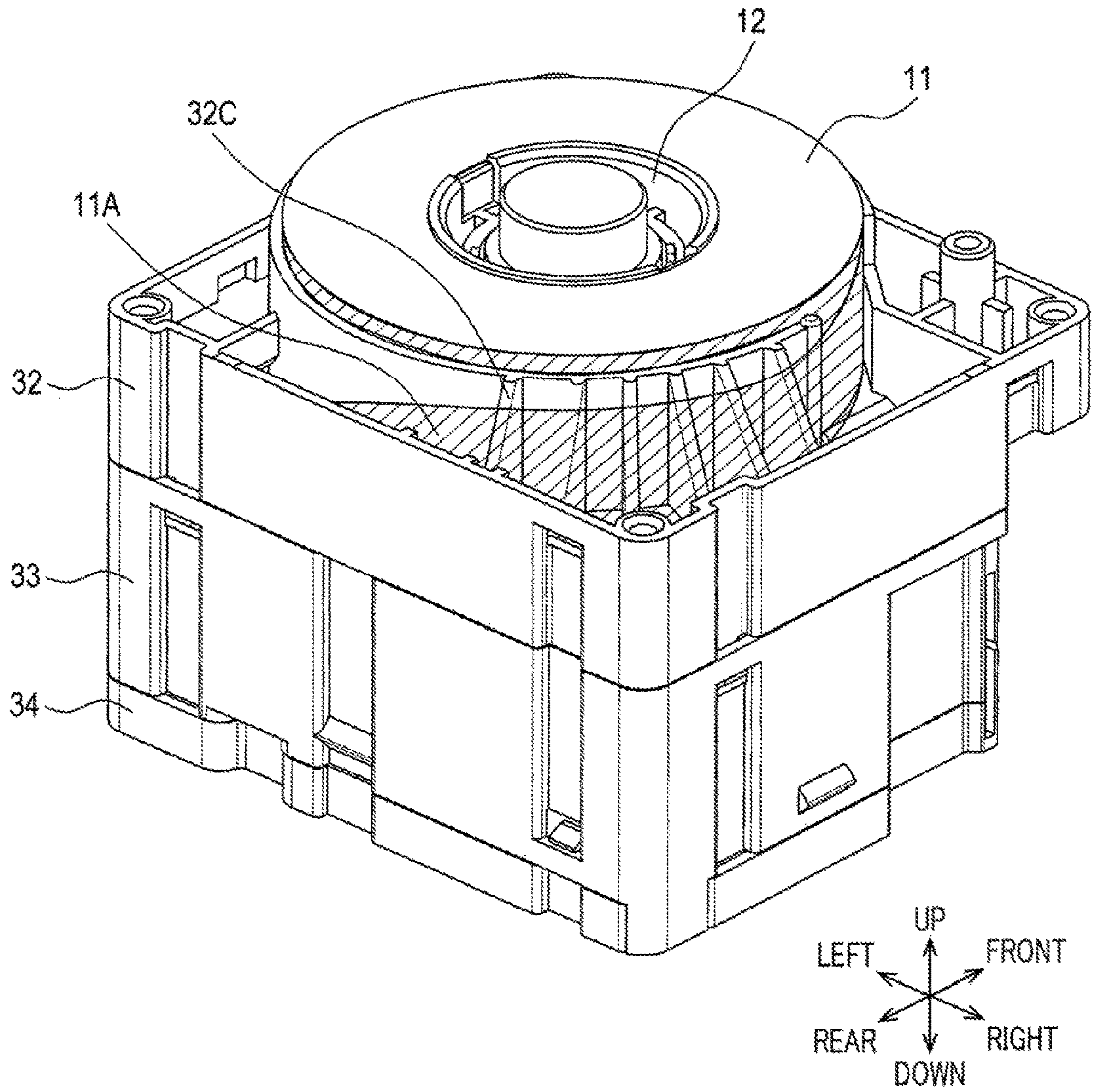
FIG. 6 is a schematic perspective view of the printing cassette shown in FIG. 3C in a state where a first cover part is disassembled therefrom.

As shown in FIG. 6, the first guide 32C is a portion around which the printing tape 11A paid off the first roll 11 is wrapped. The first guide 32C has a plurality of plate-like ribs spaced apart from one another in the circumferential direction of the first roll 11. The ribs protrude outward in radial directions of the first roll 11. The amount of protrusion (i.e., the plate width) of each rib increases toward the lower end thereof.

The first gear support part 32D shown in FIG. 4 is a gear shaft inserted through the output gear 21 and rotatably supporting the output gear 21. The second gear support part 32E is a gear shaft inserted through the input gear 22 and rotatably supporting the input gear 22. The third gear support part 32F is a gear shaft inserted through the idle gear 23 and rotatably supporting the idle gear 23.

Figure 8:
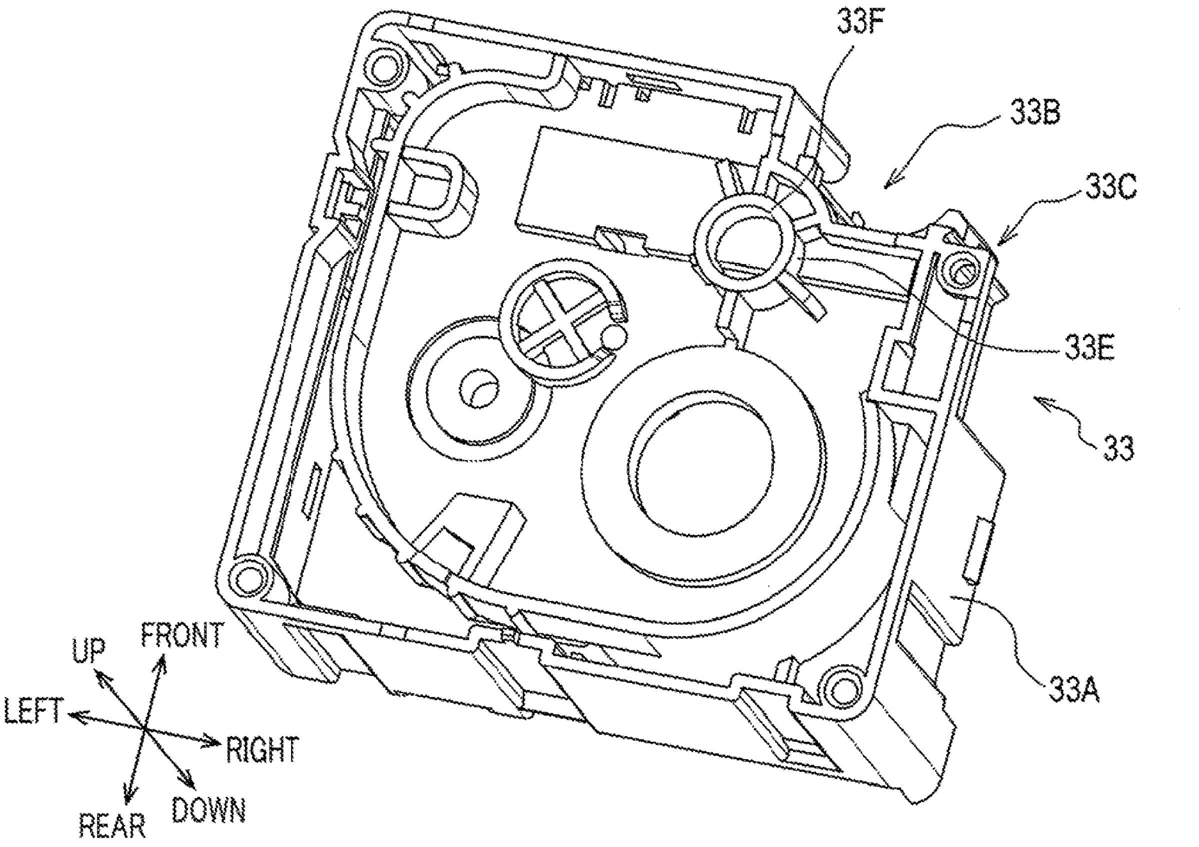
FIG. 8 is a schematic perspective view of a second frame part shown in FIG. 4.

The second frame part 33 has a second side wall 33A, the head opening 33B, a discharge port 33C, a second guide 33D, and an engaging part 33E (see FIG. 8). The second side wall 33A constitutes a side surface of the printing cassette 10 that is parallel to the up-down direction.

The head opening 33B is a notch formed by cutting off a portion of the second side wall 33A. The head opening 33B is a space in which the print head 102 is disposed in a state where the printing cassette 10 is attached to the printing device body 100.

Printing is performed on the printing tape 11A by the print head 102 in the head opening 33B. The head opening 33B is open in the downward direction of the printing cassette 10 so that the print head 102 can be inserted from below.

Figure 7:
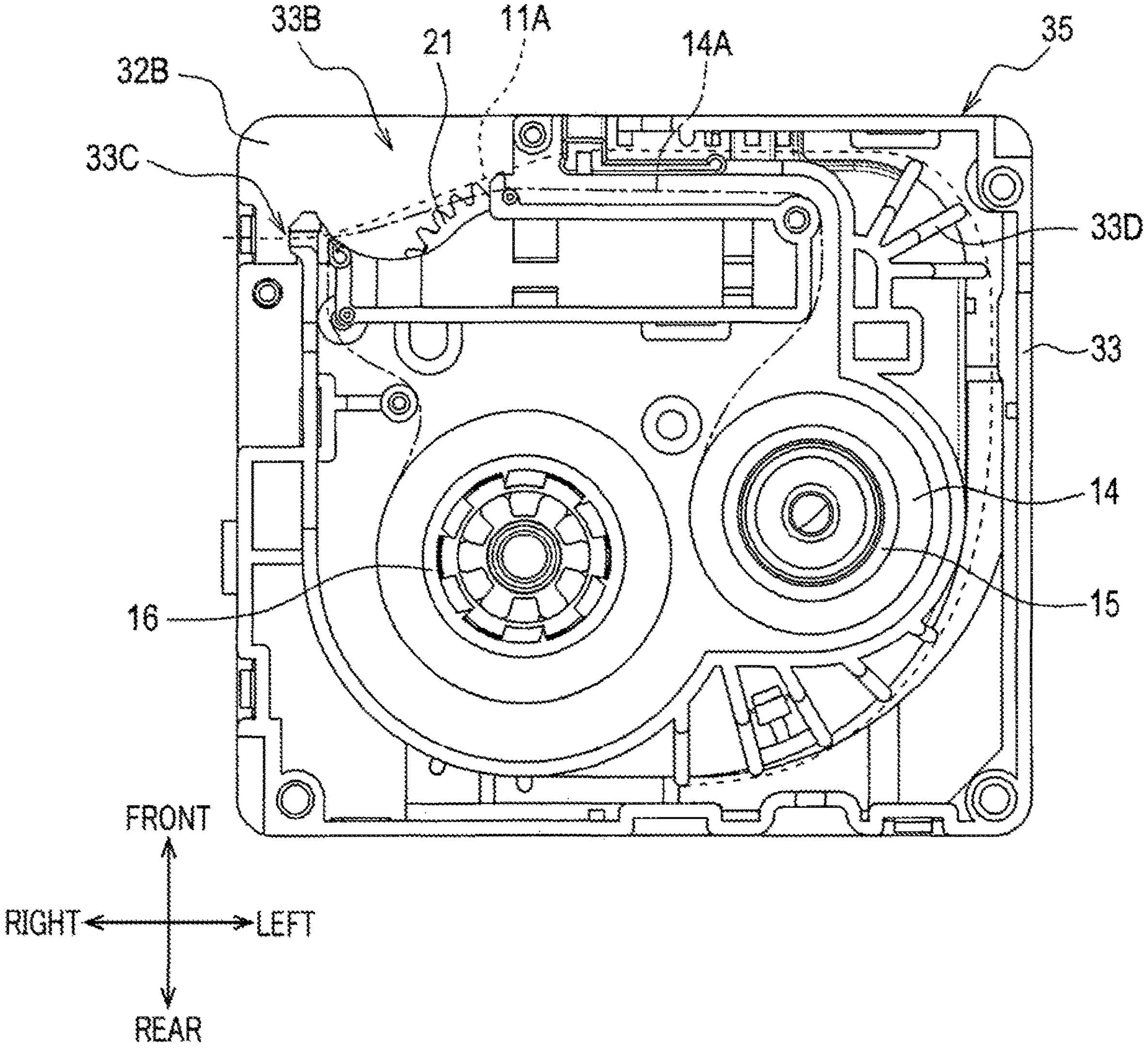
FIG. 7 is a view for explaining a path for printing tape and a path for ink ribbon in the printing cassette shown in FIG. 3A.

As shown in FIG. 7, the printing tape 11A and ink ribbon 14A are bridged over the head opening 33B in the left-right direction. The printing tape 11A that has been used for printing is discharged to the outside of the printing device 1 through the discharge port 33C. A portion of the output gear 21 is positioned in the head opening 33B. The cover portion 32B is also exposed in the head opening 33B.

The second guide 33D is a portion around which the printing tape 11A is wrapped after passing over the first guide 32C. As with the first guide 32C, the second guide 33D has a plurality of plate-like ribs spaced apart from one another in the circumferential direction of the second roll 14. The ribs protrude outward in radial directions of the second roll 14. The amount of protrusion (i.e., the plate width) of each rib decreases toward the lower end thereof.

The engaging part 33E shown in FIG. 8 is a recessed part configured to fit around the first gear support part 32D of the first frame part 32. Specifically, the engaging part 33E is a cylindrical body having a circumferential surface parallel to the up-down direction, and an inner diameter approximately equivalent to the outer diameter of the first gear support part 32D.

The engaging part 33E has a top surface 33F (an example of the second restricting surface) for restricting the output gear 21 from moving in the up-down direction (i.e., in a direction parallel to the rotational axis L7). The top surface 33F and the surface of the cover portion 32B sandwich the output gear 21 therebetween in a direction parallel to the rotational axis L7 of the output gear 21 (i.e., the up-down direction) to restrict movement of the output gear 21 in the up-down direction.

The first gear support part 32D, which is inserted through the output gear 21, protrudes from the surface of the cover portion 32B toward the top surface 33F of the engaging part 33E. The distal end of the first gear support part 32D is inserted into the hollow portion of the engaging part 33E from above.

As shown in FIGS. 9A, 9B, 9C, and 9D, the first guide 32C and second guide 33D constitute a passage through which the printing tape 11A, which constitutes the first roll 11, is conveyed from the first housing section 41 to the second housing section 42.

Figure 9A:
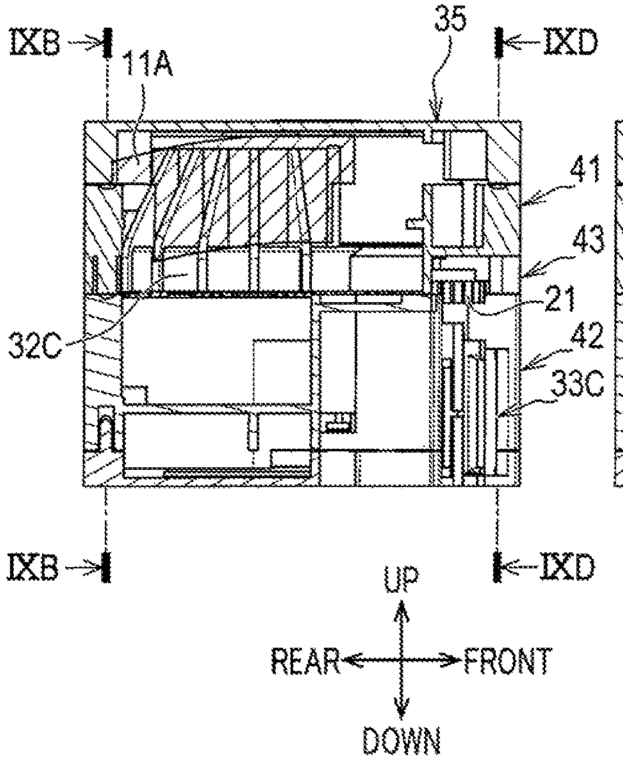
FIG. 9A is a schematic cross-sectional view taken along line IXA-IXA of FIG. 3C.
Figure 9B:
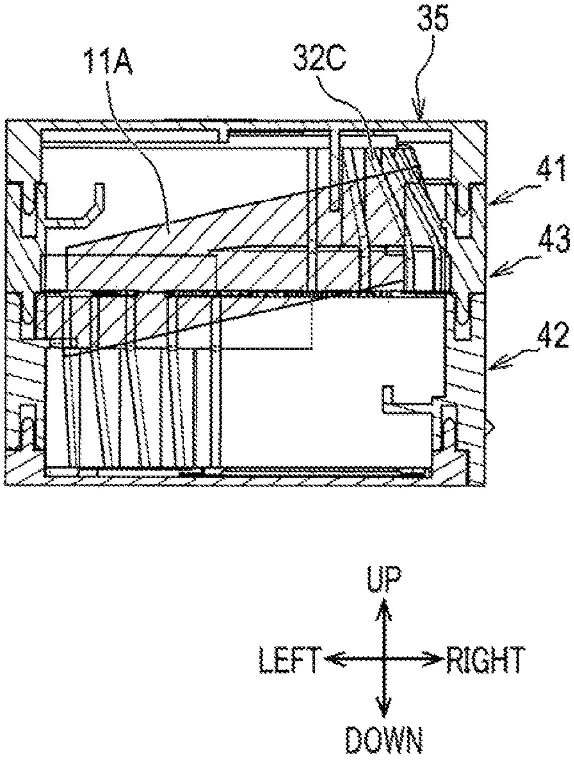
FIG. 9B is a schematic cross-sectional view taken along line IXB-IXB of FIG. 3C.

Specifically, the printing tape 11A that has been drawn off the first roll 11 is conveyed downward and rearward inside the first housing section 41 while contacting the first guide 32C from the outer radial side of the first roll 11 so as to form a spiral, as illustrated in FIG. 9A. The printing tape 11A is further conveyed downward and leftward while passing through the third housing section 43 in the up-down direction, as illustrated in FIG. 9B.

Figure 9C:
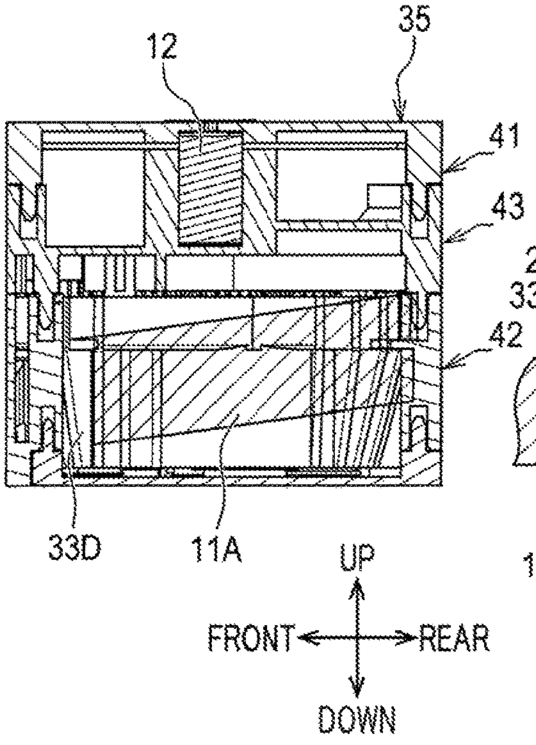
FIG. 9C is a schematic cross-sectional view taken along line IXC-IXC of FIG. 3C.
Figure 9D:
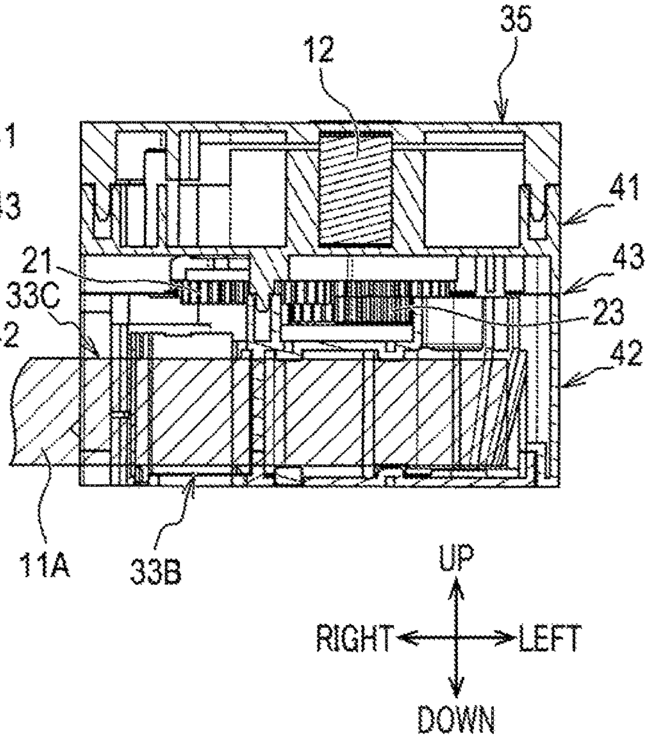
FIG. 9D is a schematic cross-sectional view taken along line IXD-IXD of FIG. 3C.

After reaching the second housing section 42, the printing tape 11A is conveyed downward and forward while contacting the second guide 33D from the outer radial side, as illustrated in FIG. 9C. Upon reaching the lower end portion of the printing cassette 10, the printing tape 11A passes through the head opening 33B and is discharged through the discharge port 33C, as illustrated in FIG. 9D.

<Label>

Figure 10C:
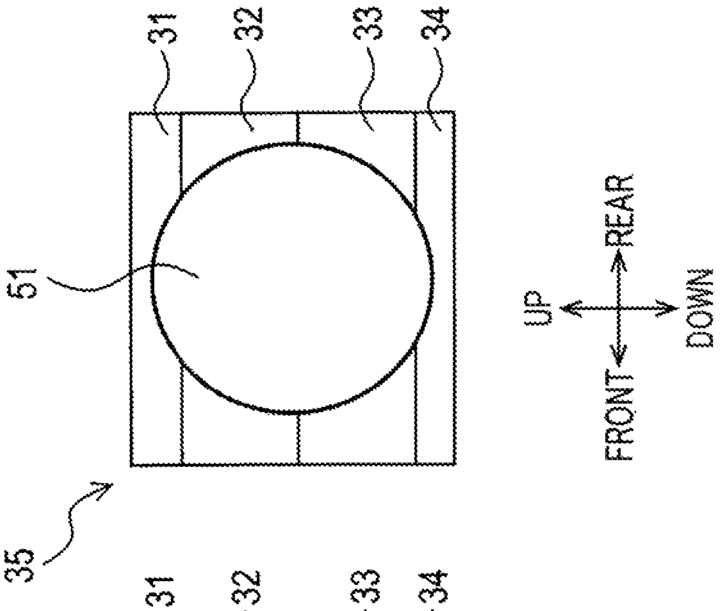
FIGS. 10A to 10C are schematic views each illustrating the position of a label in the printing cassette shown in FIG. 3A.
Figure 10B:
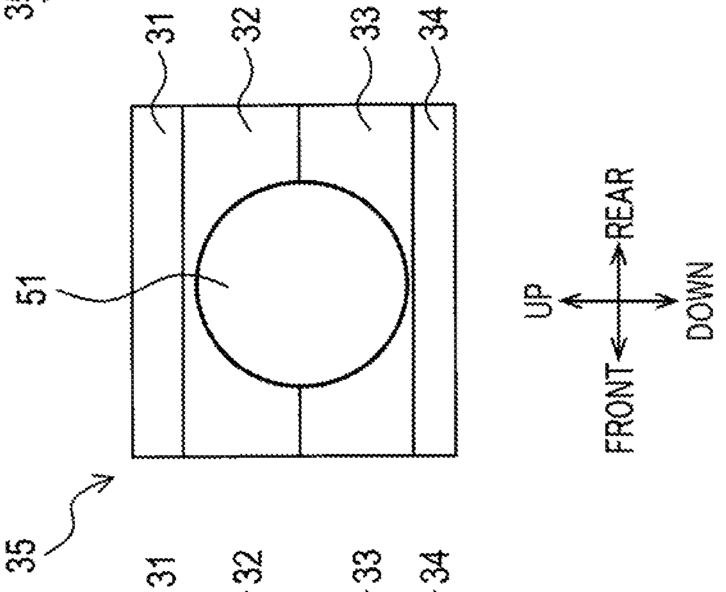
Figure 10A:
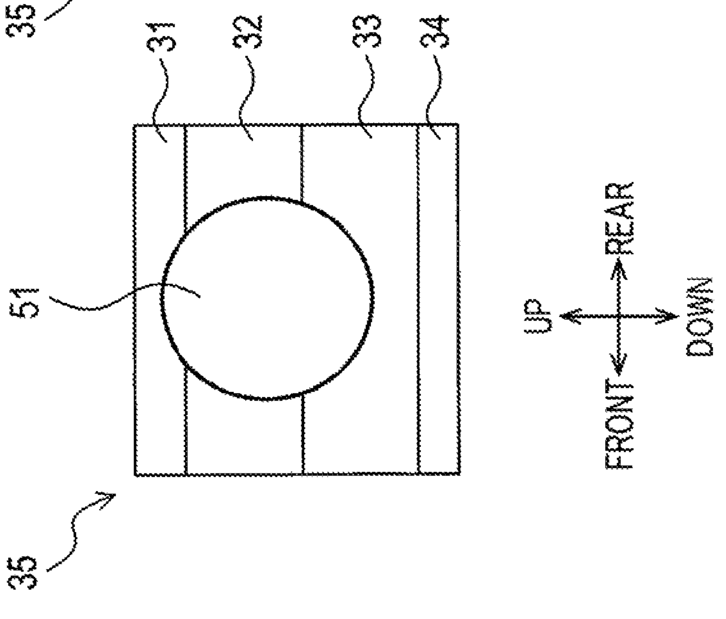

The label 51 shown in FIG. 10A allows an external device (such as the printing device body 100) to detect identification information for identifying the printing cassette 10.

Figure 11A:
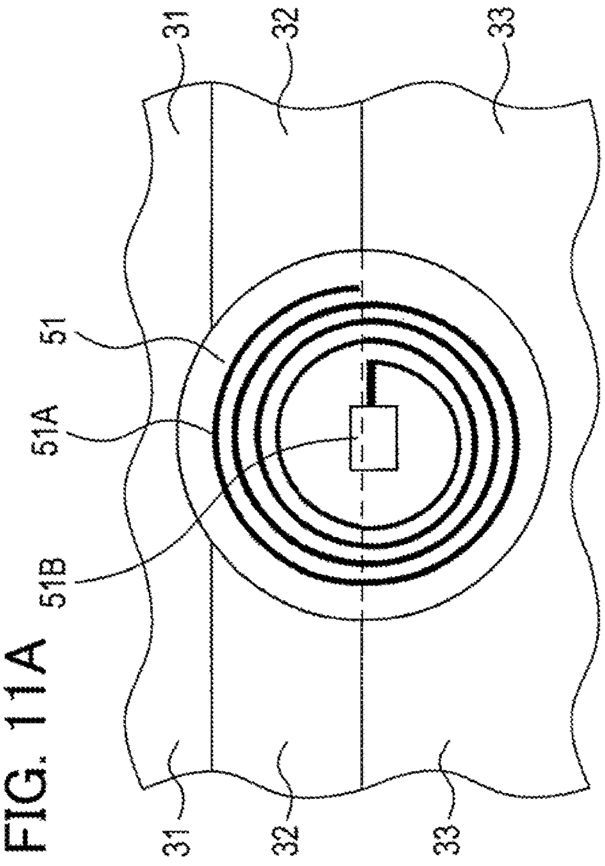
FIGS. 11A to 11C are schematic views each illustrating the label shown in FIG. 10A.

As shown in FIG. 11A, the label 51 is a circular sheet configured of an adhesive layer and an RFID tag arranged on the adhesive layer. The RFID tag has an antenna 51A, and an IC chip 51B. The label 51 allows the detection unit 108 of the printing device body 100 to detect identification information stored in the IC chip 51B through contactless reading of the RFID tag.

The identification information includes information related to the transmission mechanism 20, information related to the printing tape 11A, and the like. Examples of the information related to the transmission mechanism 20 include information on the transmission ratio obtained by dividing the rotational speed of the input gear 22 by the rotational speed of the output gear 21, information on the number of rotary bodies (e.g., gears) included in the transmission mechanism 20, and the like. Examples of the information related to the printing tape 11A include the width, thickness, material, color, layer composition, and the like of the printing tape 11A.

In the present embodiment, the label 51 is affixed across the outer surface of the first frame part 32, the outer surface of the second frame part 33, and the outer surface of the first cover part 31. Further, the antenna 51A and IC chip 51B of the label 51 are arranged across the first frame part 32 and second frame part 33. This arrangement can help suppress looseness between the first frame part 32 and second frame part 33.

As shown in FIG. 3A, the label 51 is affixed to a left-side surface 35A among the side surfaces of the case 35. The left-side surface 35A is parallel to both an insertion direction in which the case 35 is inserted into the cassette accommodation part 101 (i.e., the up-down direction) and the winding axis of the first roll 11.

As shown in FIG. 5, the label 51 is disposed in a position overlapping the output gear 21 (and specifically, disposed leftward of the output gear 21) in a direction orthogonal to the rotational axis L7 of the output gear 21 (i.e., in the left-right direction). That is, the label 51 is overlapped with the output gear 21 as viewed in a direction orthogonal to the rotational axis L7 (i.e., as viewed in the left-right direction).

The label 51 may be affixed across only the first frame part 32 and second frame part 33, as illustrated in FIG. 10B. Alternatively, the label 51 may be affixed across the first frame part 32, second frame part 33, first cover part 31, and second cover part 34, as illustrated in FIG. 10C.

Figure 11B:
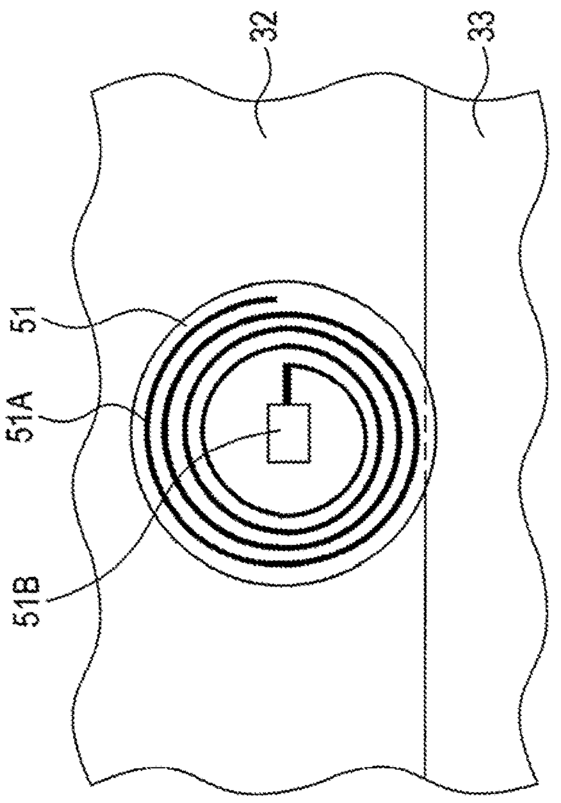
Figure 11C:
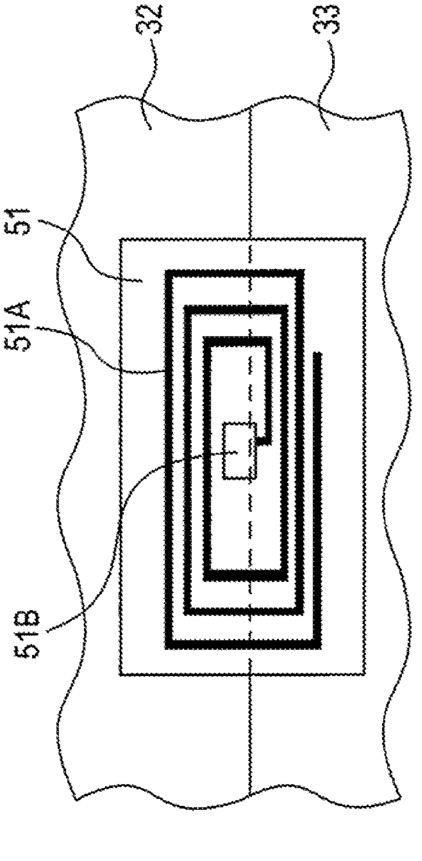

Further, the antenna 51A and IC chip 51B need not necessarily be arranged across both the first frame part 32 and second frame part 33, as illustrated in FIG. 11B. Further, the label 51 is not limited to a circular shape but may be rectangular, as illustrated in FIG. 11C.

<Conveyance and Printing of Tape by the Printing Device Body>

In a state where the printing cassette 10 is attached to the printing device body 100, the print head 102 is disposed in the head opening 33B at a position overlapping both the printing tape 11A and ink ribbon 14A in the front-rear direction (i.e., at a position overlapping both the printing tape 11A and ink ribbon 14A as viewed in the front-rear direction), as shown in FIG. 7.

The platen roller 103 conveys the printing tape 11A into the head opening 33B and presses the printing tape 11A against the print head 102, whose heating elements are generating heat, through the ink ribbon 14A. As a result, some ink provided on the surface of the ink ribbon 14A is transferred onto the printing tape 11A to print characters, symbols, and the like on the printing tape 11A.

Figure 12:
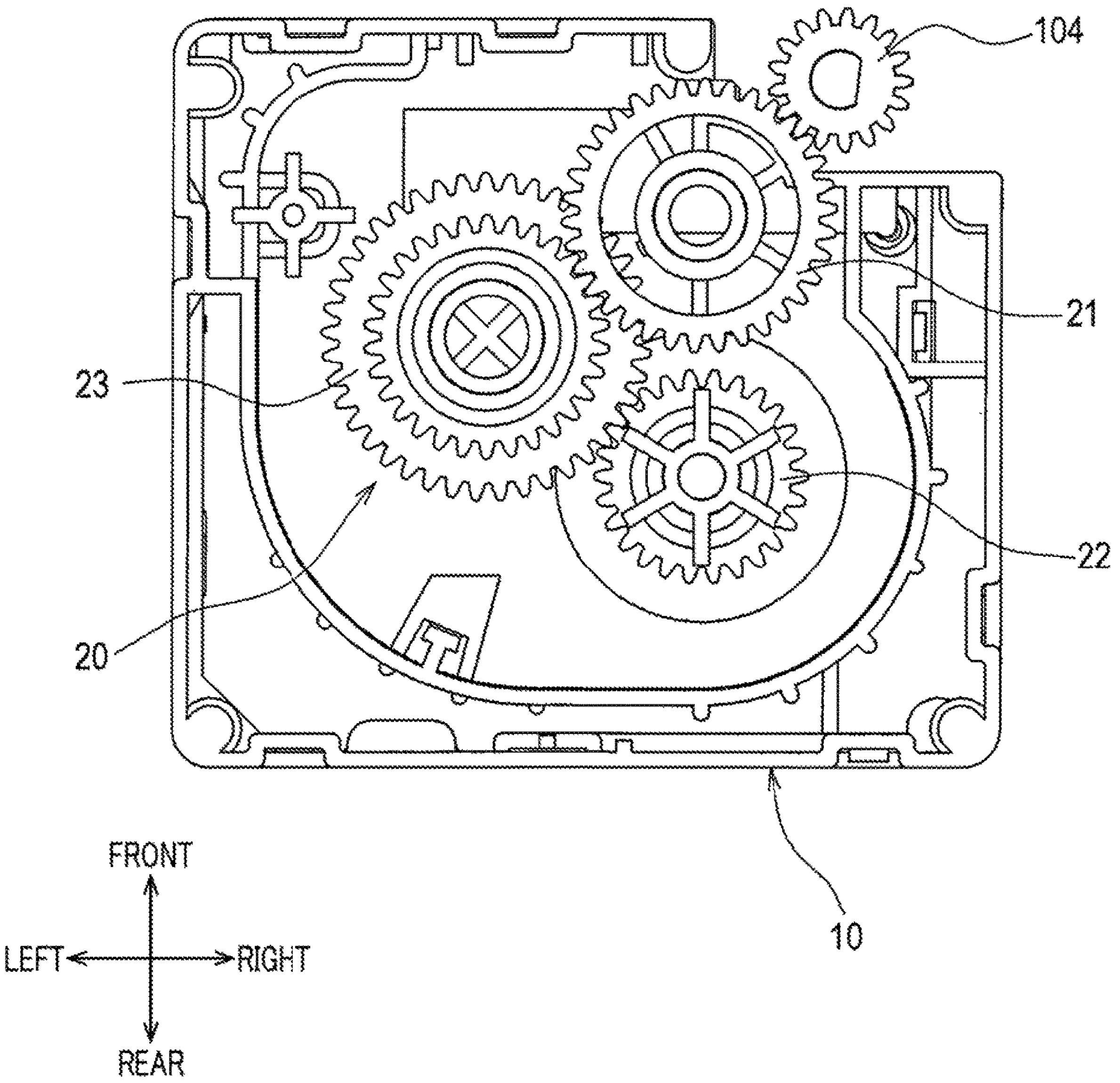
FIG. 12 is a schematic view illustrating how an output gear and a platen gear are engaged with each other in the printing device shown in FIG. 1A.

The platen roller 103 conveys the printed printing tape 11A in the printing cassette 10 toward the outside of the printing cassette 10. The platen roller 103 is rotated by the platen gear 104, which is engaged with the output gear 21. The platen roller 103 and platen gear 104 can pivot between a position separated from the printing cassette 10 and a position shown in FIG. 12 in which the platen gear 104 is engaged with the output gear 21.

In a state where the case 35 of the printing cassette 10 is inserted in the cassette accommodation part 101, the drive shaft 105 is engaged with the input gear 22 and the platen gear 104 is engaged with the output gear 21.

Specifically, the platen gear 104 comes into engagement with the output gear 21 when the platen roller 103 and platen gear 104 pivot toward the head opening 33B of the printing cassette 10 in a state where the drive shaft 105 is inserted into both the input spool 16 and input gear 22 of the printing cassette 10.

In a state where the printing cassette 10 is attached, the output gear 21 is rotated when the drive shaft 105 rotates the input gear 22. Further, the platen gear 104 is rotated by the rotation of the output gear 21, and the platen roller 103 is rotated by the rotation of the platen gear 104.

In other words, the drive source 107 inputs a drive force into the input gear 22 via the drive shaft 105. Further, the platen roller 103 conveys the printing tape 11A by the drive force outputted from the output gear 21.

The detection unit 108 detects identification information from the label 51 of the printing cassette 10 attached in the cassette accommodation part 101. The detection unit 108 transmits the detected identification information to the control unit 109.

The control unit 109 controls the printing cycle of the print head 102 (i.e., the cycle of switching the on-off state of heating) on the basis of this identification information. Specifically, the control unit 109 sets a longer printing cycle for larger transmission ratios and, conversely, sets a shorter printing cycle for smaller transmission ratios.

The control unit 109 also controls the rotating direction of the drive source 107 on the basis of the identification information. Specifically, the control unit 109 sets the rotating direction of the drive source 107 on the basis of the information on the number of rotary bodies so that the platen roller 103 is rotated in the direction for conveying the printing tape 11A.

1-2. Effects

The following effects can be obtained according to the embodiment described above.

(1a) The label 51 provided with an RFID tag can suppress looseness between the first frame part 32 and second frame part 33. Additionally, the label 51 provided for mounting an RFID tag on the case 35 also functions as a member that suppresses looseness, thereby avoiding an increase in the number of parts required for the printing cassette 10.

(1b) Affixing the label 51 to the outer surface of the case 35 can enhance detection accuracy of the detection unit 108 for detecting identification information.

(1c) Suppressing looseness between the first frame part 32 and second frame part 33 that support and accommodate the output gear 21 can reduce vibration in the output gear 21. Thus, this configuration can stabilize the engagement between the output gear 21 and platen gear 104.

(1d) Arranging the label 51 at a position overlapping the output gear 21 in the left-right direction (arrangement in which the label 51 and the output gear 21 are overlapped with each other as viewed in the left-right direction) can reduce the area of the left-side surface 35A of the case 35 on which the label 51 is affixed. As a result, the size of the printing cassette 10 can be reduced.

(1e) Affixing the label 51 to the left-side surface 35A of the case 35 can avoid any interference between the detection unit 108 and other components of the printing device body 100. As a result, the size of the printing device body 100 can be reduced.

2. SECOND EMBODIMENT

2-1. Configuration of a Printing Device

Figure 13A:
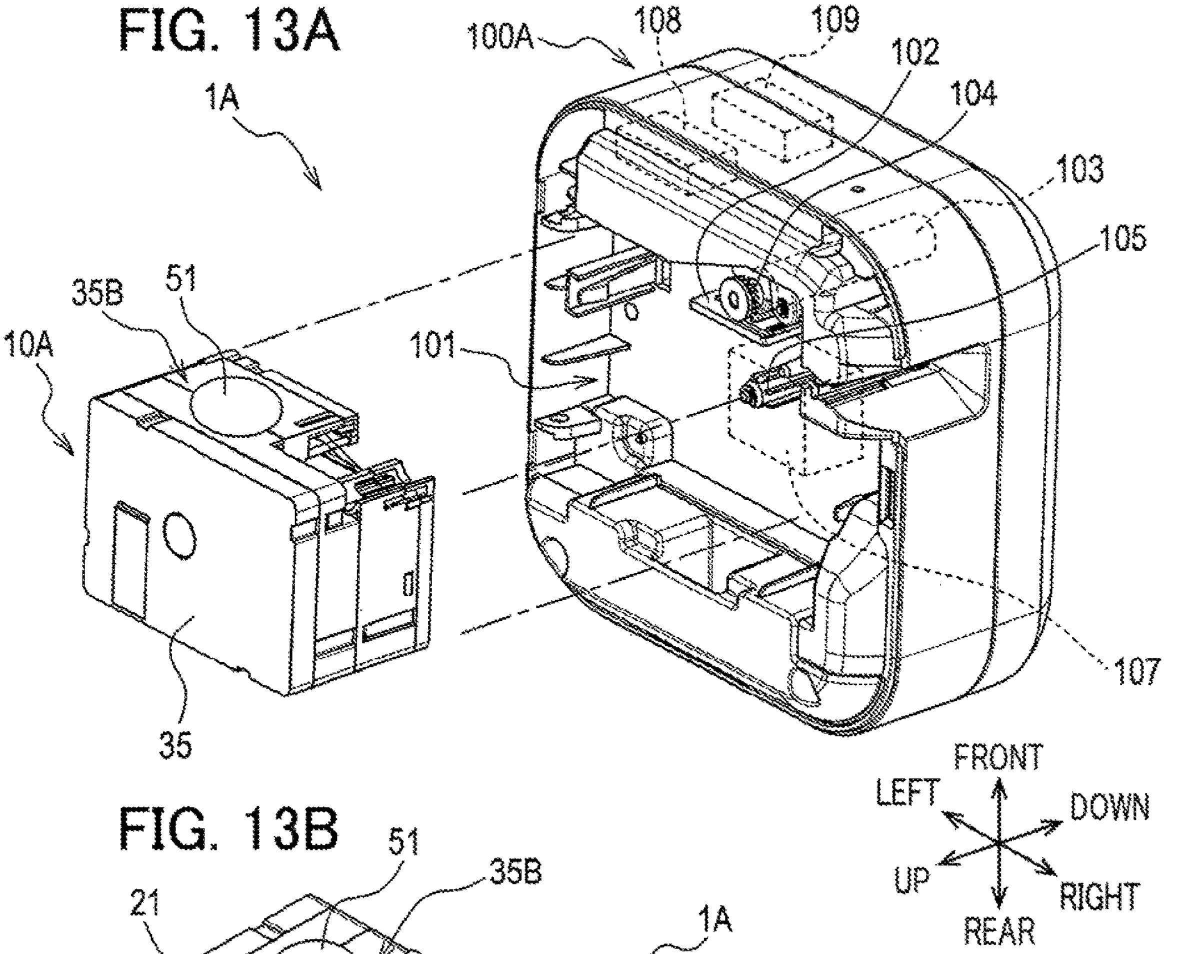
FIGS. 13A and 13B are schematic perspective views of a printing device in a state where a printing cassette is detached from a printing device body of the printing device.
Figure 13B:
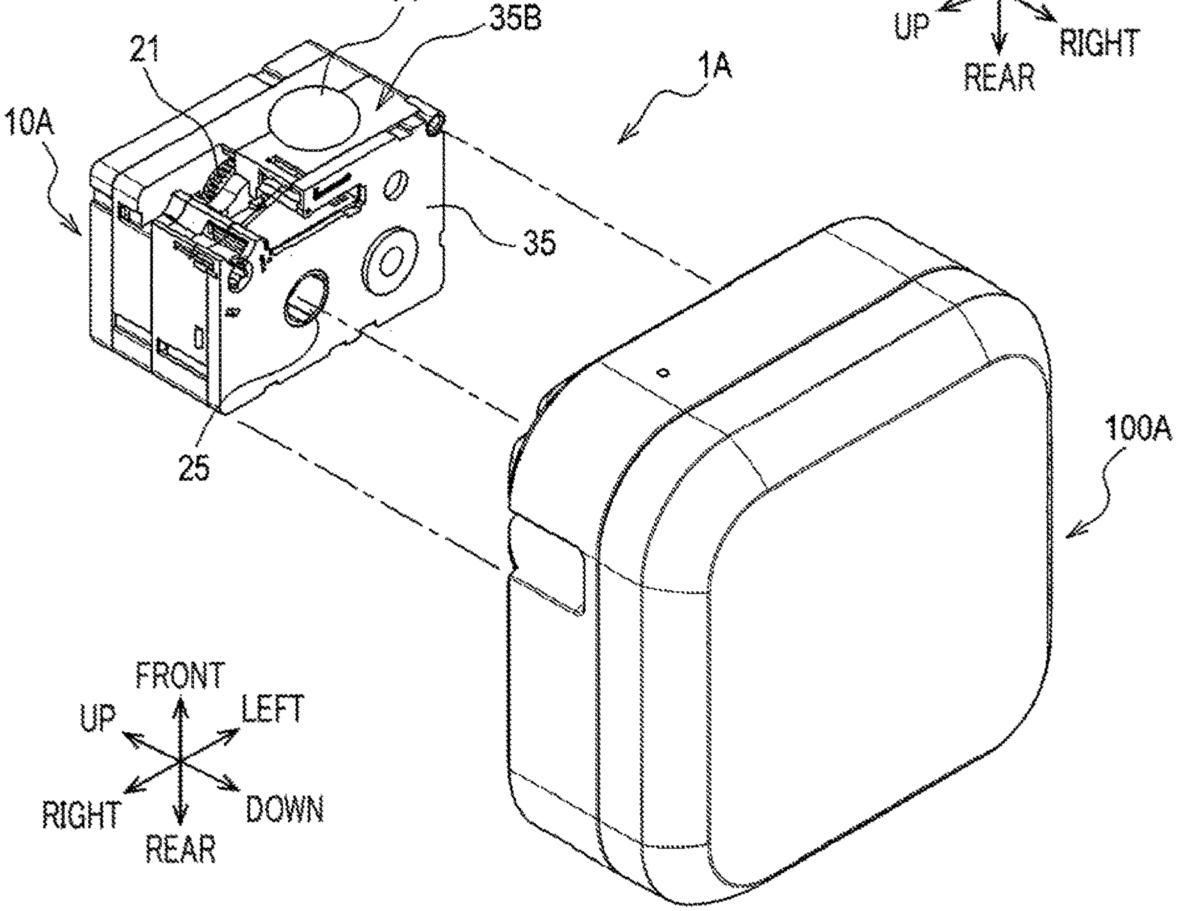

A printing device 1A shown in FIGS. 13A and 13B is provided with a printing cassette 10A and a printing device body 100A.

<Printing Cassette>

Figure 14:
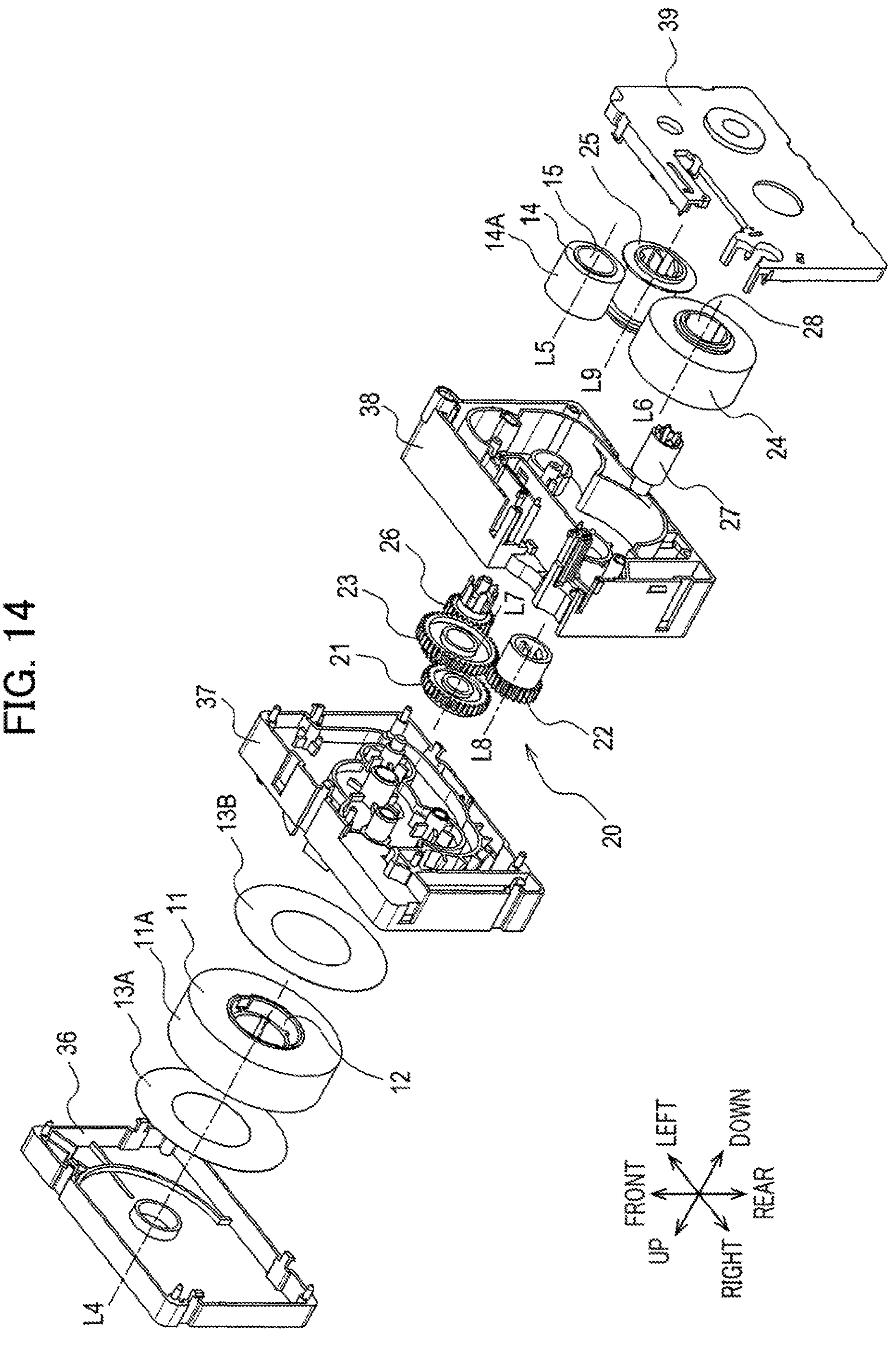
FIG. 14 is a schematic exploded perspective view of the printing cassette shown in FIG. 13A.

The printing cassette 10A includes a third roll 24, a take-up spool 25, a take-up gear 26, and a pinch roller 27 shown in FIG. 14 in addition to the components in the printing cassette 10 of the first embodiment. The printing cassette 10A also includes an input spool 28, a first cover part 36, a first frame part 37, a second frame part 38, and a second cover part 39 in place of the input spool 16, first cover part 31, first frame part 32, second frame part 33, and second cover part 34 in the printing cassette 10 of the first embodiment.

The input spool 28 is identical to the input spool 16 in the first embodiment, except that the input spool 28 does not possess the splines 16B. The first cover part 36, first frame part 37, second frame part 38, and second cover part 39 are respective versions of the first cover part 31, first frame part 32, second frame part 33, and second cover part 34 that have been elongated in the left-right direction. Except for the points described below, all other configurations in the printing cassette 10A are identical to those in the printing cassette 10 of the first embodiment and, hence, a description of these configurations will be omitted.

In the present embodiment, the label 51 is affixed to a front surface 35B of the case 35, as illustrated in FIGS. 13A and 13B. The label 51 is affixed at least over the outer surface of the first frame part 37 and the outer surface of the second frame part 38.

The third roll 24 shown in FIG. 14 is configured of a laminating tape wound around the input spool 28. The laminating tape is used for protecting the printing tape 11A. The laminating tape has an adhesive surface that is bonded to the printing tape 11A after the printing tape 11A has been printed by the print head 102.

The take-up spool 25 is rotatable about a rotational axis L9. The rotational axis L9 of the take-up spool 25 is parallel to the rotational axis L5 of the second supply spool 15 (i.e., parallel to the up-down direction). The take-up spool 25 takes up the ink ribbon 14A as the take-up gear 26 rotates.

The take-up gear 26 is coupled to the take-up spool 25 and engaged with the idle gear 23. The take-up gear 26 rotates the take-up spool 25 when driven to rotate by the drive force inputted into the input gear 22.

The pinch roller 27, in cooperation with a pressure roller 106 described later, presses the laminating tape against the printing tape 11A after the printing tape 11A has been printed. The pinch roller 27 is disposed downstream of the head opening 33B in the conveying direction of the printing tape 11A.

<Printing Device Body>

Figure 15:
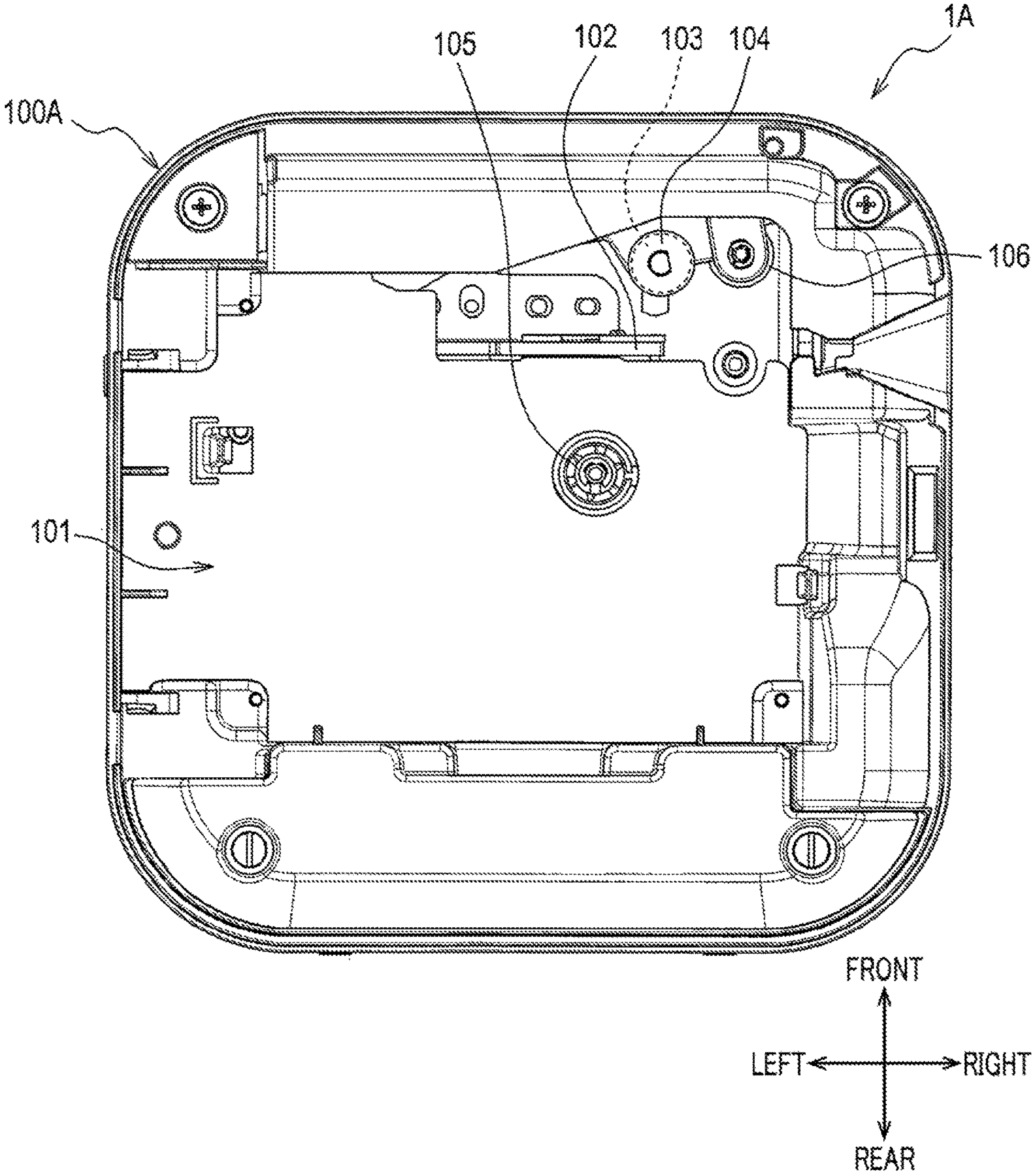
FIG. 15 is a schematic plan view of the printing device body shown in FIG. 13A.

As shown in FIG. 13A, the printing device body 100A is provided with a cassette accommodation part 101, print head 102, platen roller 103, platen gear 104, drive shaft 105, pressure roller 106 (see FIG. 15), drive source 107, detection unit 108, control unit 109, and housing 110.

The printing device body 100A has the same configuration as the printing device body 100 in the first embodiment, except that the shape of the housing 110 in the second embodiment differs from that in the first embodiment and the printing device body 100A is further provided with the pressure roller 106.

Figure 16:
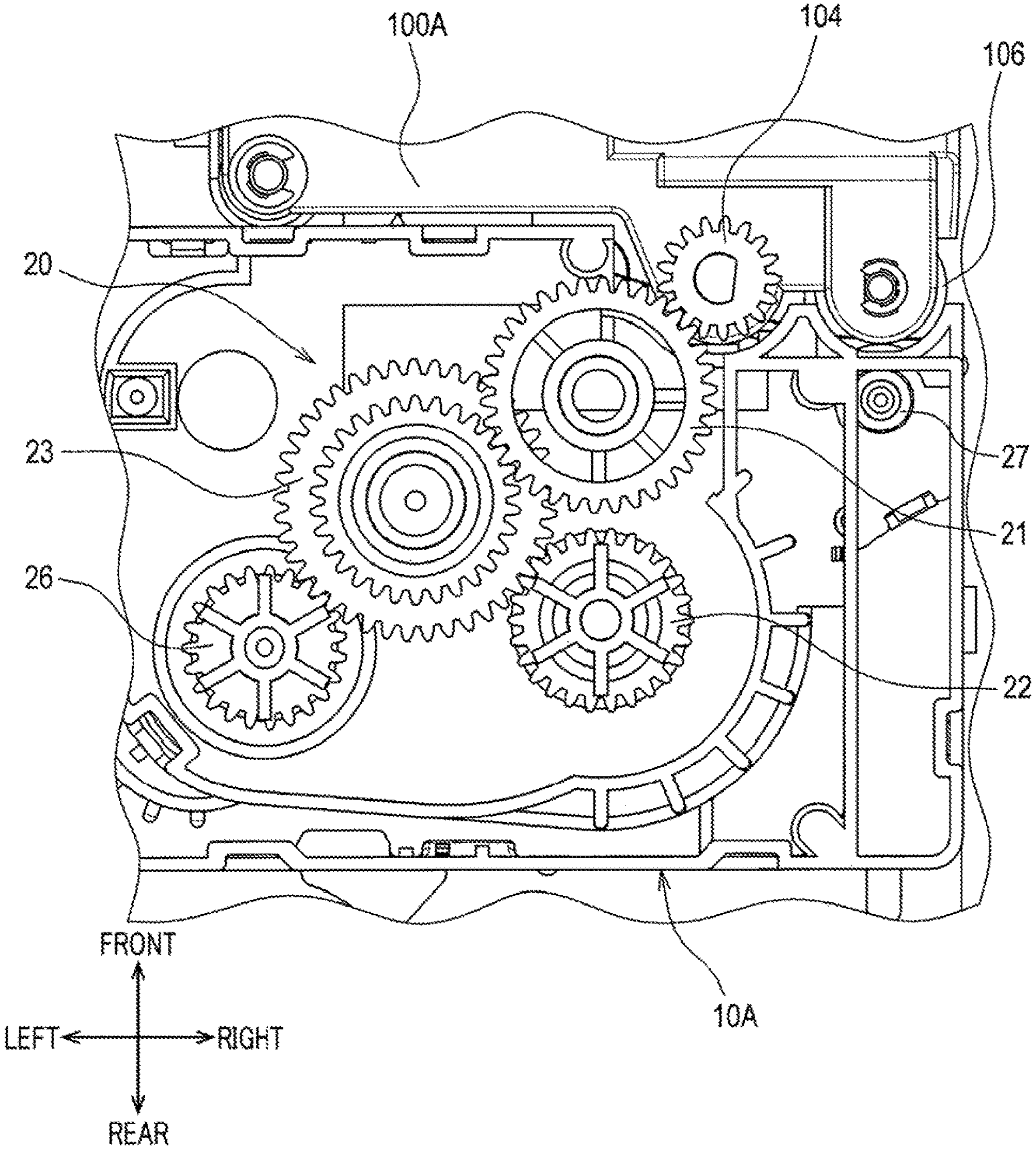
FIG. 16 is a schematic view how an output gear and a platen gear are engaged with each other in the printing device shown in FIG. 13A.

The pressure roller 106 is configured to pivot together with the platen roller 103 and platen gear 104. That is, the pressure roller 106 can pivot between a position separated from the printing cassette 10A, shown in FIG. 15, and a position for pressing the printing tape 11A and the laminating tape against the pinch roller 27, shown in FIG. 16.

2-2. Effects

The following effects can be obtained according to the embodiment described above.

(2a) In addition to the same advantages described in the first embodiment, the laminating tape in the second embodiment can protect content printed on the printing tape 11A.

3. OTHER EMBODIMENTS

Figure 17A:
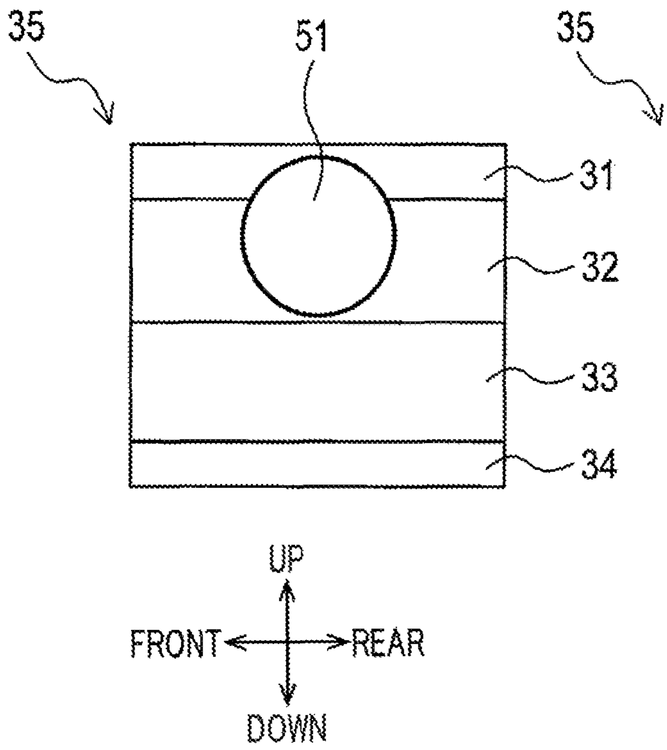
FIGS. 17A and 17B are schematic views each illustrating the position of a label in a printing cassette.
Figure 17B:
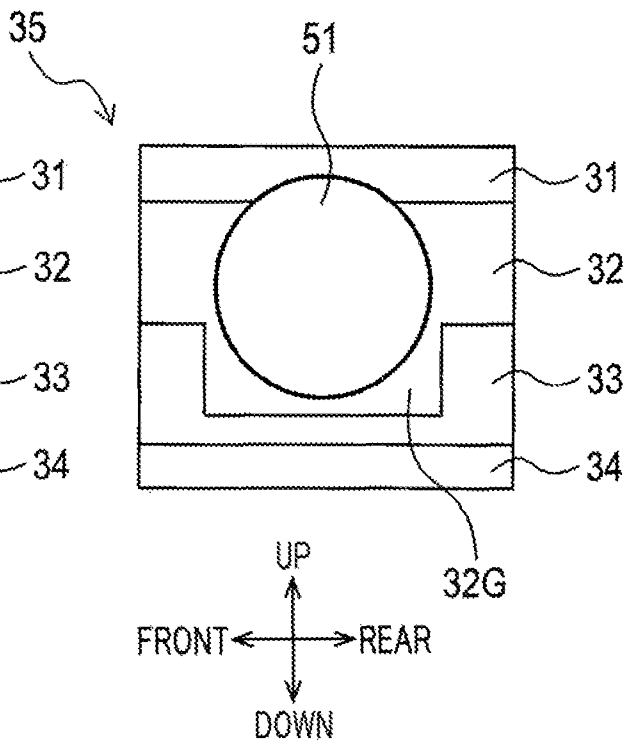

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(3a) In the printing cassette of the above embodiments, labels having an RFID tag need not necessarily be affixed across both the first frame part and second frame part. For example, the label 51 may be affixed across the first frame part 32 and first cover part 31 of the case 35, as illustrated in FIGS. 17A and 17B.

In these cases, the first frame part 32 corresponds to the first case part and the first cover part 31 corresponds to the second case part. In the example of FIG. 17B, the first frame part 32 has a projection part 32G that projects toward the second frame part 33 (i.e., downward), and the label 51 is affixed across the projection part 32G and the first cover part 31.

(3b) In the printing cassette of the above embodiments, the label need not necessarily be affixed to the outer surface of the case. For example, the label may be affixed across the inner surface of the first case part and the inner surface of the second case part.

(3c) The printing device in the above embodiments is not limited to a device that prints with an ink ribbon. For example, the printing device may use a strip of thermal paper in place of the printing tape in the first embodiment and may use a laminating tape (i.e., a protective tape) in place of the ink ribbon.

The printing device may also use stencil tape in place of the ink ribbon, whereby a printing pattern is perforated in the stencil tape with a thermal head. In this case, the printing tape may be overlaid on the stencil tape in the head opening in such a manner such that the printing tape is positioned closer to the print head than the stencil tape to the print head (i.e., such that the printing tape serves as the top layer) or may be overlaid on the stencil tape in such a manner that the printing tape is positioned farther away from the print head than the stencil tape from the print head (i.e., such that the printing tape serves as the bottom layer).

(3d) In the printing cassette of the above embodiments, the transmission mechanism may possess two or more idle gears. Alternatively, the transmission mechanism need not necessarily have an idle gear. Further, the transmission mechanism may have rotary bodies (e.g., rollers or belts) other than gears.

(3e) The printing cassette in the second embodiment may be provided with a third supply spool in place of the take-up spool, and a laminating tape may be wound around the third supply spool. Further, the input spool in the printing cassette of the second embodiment may be used as the take-up spool for taking up the ink ribbon.

(3f) Functions possessed by a single component in the embodiments described above may be distributed among a plurality of components, and functions possessed by a plurality of components may be integrated into a single component. Additionally, some of the structures in the embodiments described above may be omitted. Further, at least some of the structures in one of the above embodiments may be added to another of the above embodiments or used in place of structures in another of the above embodiments. All aspects included in the technical concepts identified from descriptions in the claims are embodiments of the present disclosure.

What is claimed is:

1. A printing cassette comprising:

a case comprising a first case part and a second case part, the first case part and the second case part being coupled to each other;

a tape for printing, at least a portion of the tape being housed in the case; and a label provided with a radio-frequency identification (RFID) tag having an antenna, wherein the label is affixed across both the first case part and the second case part.

2. The printing cassette according to claim 1, wherein the antenna is arranged across both the first case part and the second case part.

3. The printing cassette according to claim 1, wherein the label is affixed across both an outer surface of the first case part and an outer surface of the second case part.

4. The printing cassette according to claim 1, further comprising:

a third case part coupled to one of the first case part and the second case part, wherein the label is affixed across the first case part, the second case part, and the third case part.

5. The printing cassette according to claim 4, further comprising:

a gear, at least a portion of the gear being housed in the case, wherein the tape is wound to form a roll, wherein the third case part is coupled to the first case part, wherein the gear is disposed in a space defined by the first case part and the second case part, and wherein the roll is disposed in a space defined by the first case part and the third case part.

6. The printing cassette according to claim 1, further comprising:

a gear, at least a portion of the gear being housed in the case, wherein the first case part has a first restricting surface for restricting the gear from moving in a direction parallel to a rotational axis of the gear, wherein the second case part has a second restricting surface for restricting the gear from moving in the direction parallel to the rotational axis, and wherein the first restricting surface and the second restricting surface sandwich the gear therebetween in the direction parallel to the rotational axis.

7. The printing cassette according to claim 6, wherein the first case part includes a gear shaft protruding from the first restricting surface toward the second restricting surface, the gear shaft being inserted through the gear.

8. The printing cassette according to claim 5, wherein the gear is an output gear for outputting a drive force for conveying the tape.

9. The printing cassette according to claim 5, wherein the label is overlapped with the gear as viewed in a direction orthogonal to a rotational axis of the gear.

10. The printing cassette according to claim 1, wherein the printing cassette is attachable to a printing device body including a cassette accommodation part, wherein the case has a side surface that is parallel to an insertion direction in which the case is inserted into the cassette accommodation part, and wherein the label is affixed to the side surface.

11. The printing cassette according to claim 1, wherein the tape is wound about a winding axis to form a roll, wherein the case has a side surface that is parallel to the winding axis of the roll, and wherein the label is affixed to the side surface.

12. A printing device comprising:

the printing cassette according to claim 1; and a printing device body to which the printing cassette is attachable.

13. The printing cassette according to claim 1, further comprising:

a gear, at least a portion of the gear being housed in the case.

14. A printing cassette comprising:

a case;

a tape for printing, at least a portion of the tape being housed in the case;

an output gear for outputting a drive force for conveying the tape, at least a portion of the output gear being housed in the case; and a label affixed to the case, the label being provided with a radio-frequency identification (RFID) tag having an antenna, wherein the label is overlapped with the output gear as viewed in a direction orthogonal to a rotational axis of the output gear.

* * * * *